United States Patent
Hsu et al.

(10) Patent No.: US 11,623,674 B2
(45) Date of Patent: Apr. 11, 2023

(54) RAIL VEHICLE SYSTEM, RAIL VEHICLE, AND VISUAL SENSING DEVICE

(71) Applicant: MIRLE AUTOMATION CORPORATION, Hsinchu (TW)

(72) Inventors: Ming-Hsiu Hsu, Hsinchu (TW); Hsing-Lu Huang, Hsinchu (TW); Long-Yi Lai, Hsinchu (TW)

(73) Assignee: MIRLE AUTOMATION CORPORATION, Hsinchu (TW)

( * ) Notice: Subject to any disclaimer, the term of this patent is extended or adjusted under 35 U.S.C. 154(b) by 524 days.

(21) Appl. No.: 16/924,521

(22) Filed: Jul. 9, 2020

(65) Prior Publication Data

US 2021/0053596 A1 Feb. 25, 2021

Related U.S. Application Data

(60) Provisional application No. 62/891,173, filed on Aug. 23, 2019.

(30) Foreign Application Priority Data

Feb. 18, 2020 (TW) .................................. 109105084

(51) Int. Cl.
*B61L 23/34* (2006.01)
*B61L 27/04* (2006.01)
(Continued)

(52) U.S. Cl.
CPC .......... *B61L 27/04* (2013.01); *B61L 15/0027* (2013.01); *B61L 15/02* (2013.01); *B61L 23/34* (2013.01);
(Continued)

(58) Field of Classification Search
CPC .......... B61L 27/04; B61L 27/40; B61L 27/70; B61L 15/0027; B61L 15/02; B61L 23/34;
(Continued)

(56) References Cited

U.S. PATENT DOCUMENTS 9,547,802 B2   1/2017   Tseng et al.
10,604,351 B2   3/2020   Takahara et al.
(Continued)

FOREIGN PATENT DOCUMENTS

CN    206096934 U    4/2017
CN    107065871 A    8/2017
(Continued)

OTHER PUBLICATIONS

Japan Patent Office, Notice of Allowance dated Mar. 15, 2022 for JP application No. 2020-122550.

*Primary Examiner* — Mathew Franklin Gordon
(74) *Attorney, Agent, or Firm* — Li & Cai Intellectual Property (USA) Office

(57) ABSTRACT

A rail vehicle system, a rail vehicle, and a visual sensing device are provided. The rail vehicle system includes a system control device, a rail, and a rail vehicle. The rail vehicle includes a processing device and the visual sensing device. In a process where the rail vehicle travels along the rail, the visual sensing device captures images in front of the rail vehicle, and the visual sensing device emits a laser beam toward a front side of the rail vehicle. The visual sensing device receives the reflected laser beam to generate a laser sensing data. The processing device determines whether or not to change at least one of a travel direction and a travel speed of the rail vehicle according to the images captured by the visual sensing device and the laser sensing data.

30 Claims, 15 Drawing Sheets

(51) Int. Cl.
  *B61L 25/02* (2006.01)
  *B61L 25/04* (2006.01)
  *B61L 15/00* (2006.01)
  *B61L 15/02* (2006.01)
  *H04N 7/18* (2006.01)
  *B61L 27/40* (2022.01)
  *B61L 27/70* (2022.01)

(52) U.S. Cl.
  CPC ............ *B61L 25/025* (2013.01); *B61L 25/04* (2013.01); *B61L 27/40* (2022.01); *B61L 27/70* (2022.01); *H04N 7/183* (2013.01); *B61L 2201/00* (2013.01); *B61L 2205/00* (2013.01)

(58) Field of Classification Search
  CPC .... B61L 25/025; B61L 25/04; B61L 2201/00; B61L 2205/00; H04N 7/183
  See application file for complete search history.

(56) References Cited

U.S. PATENT DOCUMENTS

| | | |
|---|---|---|
| 2012/0078452 A1 | 3/2012 | Daum et al. |
| 2017/0274916 A1 | 9/2017 | Nock et al. |
| 2018/0367614 A1 | 12/2018 | Millar |
| 2019/0260973 A1 | 8/2019 | Behety |

FOREIGN PATENT DOCUMENTS

| | | |
|---|---|---|
| CN | 108388248 A | 8/2018 |
| JP | 62296208 A | 12/1987 |
| JP | 2017211195 A | 11/2017 |
| JP | 2018128914 A | 8/2018 |
| JP | 2018136844 A | 8/2018 |
| JP | 2018180702 A | 11/2018 |
| TW | I224566 B | 12/2004 |
| TW | 201525934 A | 7/2015 |
| TW | 201905617 A | 2/2019 |
| WO | 2016103562 A1 | 6/2016 |

RAIL VEHICLE SYSTEM, RAIL VEHICLE, AND VISUAL SENSING DEVICE

CROSS-REFERENCE TO RELATED PATENT APPLICATION

This application claims priority from the U.S. Provisional Patent Application Ser. No. 62/891,173 filed Aug. 23, 2019, which application is incorporated herein by reference in its entirety.

This application claims the benefit of priority to Taiwan Patent Application No. 109105084, filed on Feb. 18, 2020. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a rail vehicle system, a rail vehicle, and a visual sensing device, and more particularly to a rail vehicle system and a rail vehicle for carrying an object and a visual sensing device suitable for being mounted on the rail vehicle.

BACKGROUND OF THE DISCLOSURE

An operation of a conventional rail vehicle system is described as follows. After one of a plurality of rail vehicles receives an instruction transmitted by a server, the rail vehicle travels to a certain position along a rail. Before the rail vehicle travels to the certain position, the rail vehicle basically does not communicate with the server. After the rail vehicle arrives at the certain position determined by the server, the rail vehicle communicates with the server again to receive next instruction.

Since each of the rail vehicles is only in communication with the server, and the rail vehicles are not in communication with each other, only the server is aware of a current position of each of the rail vehicles, and the server determines the instructions to deliver so as to prevent the rail vehicles from colliding with each other according the current position of each of the rail vehicles.

However, for the above operation, in situations such as when any one of the rail vehicles is in poor communication with the server, the communication between any one of the rail vehicles and the server is delayed, or when an obstacle suddenly appears on the rail, then the rail vehicles are prone to collision with each other, which may result in damage to objects carried by the rail vehicles.

SUMMARY OF THE DISCLOSURE

In response to the above-referenced technical inadequacies, the present disclosure provides a rail vehicle system to improve on issues associated with a conventional rail vehicle system. That is, in the conventional rail vehicle system, rail vehicles can easily collide with each other in various situations.

In one aspect, the present disclosure provides a rail vehicle system. The rail vehicle system includes a system control device, at least one rail, and at least one rail vehicle. The at least one rail vehicle includes a vehicle body, a processing device, and at least one visual sensing device. The vehicle body is configured to travel on the at least one rail. The processing device is disposed on the vehicle body. The processing device includes a communication module and a calculation module. The communication module is configured to be communicatively connected to the system control device. The communication module is configured to receive a travel data transmitted by the system control device. The calculation module is electrically connected to the communication module. When the communication module receives the travel data, the calculation module is configured to control the vehicle body to travel on the at least one rail along a travel direction. The at least one visual sensing device is disposed on the vehicle body. The at least one visual sensing device is electrically connected to the processing device, and the at least one visual sensing device includes an image capture module, a laser emitting module, and a laser receiving module. The image capture module is disposed on the vehicle body. The image capture module is configured to capture an image of one side of the vehicle body to generate an image capture data. The image capture module is configured to transmit the image capture data to the processing device. The laser emitting module is disposed on the vehicle body. The laser emitting module is disposed near the image capture module, and the laser emitting module is configured to emit a laser beam toward one side of the vehicle body. The laser receiving module is disposed on the vehicle body. The laser receiving module is disposed near the image capture module. The laser receiving module is configured to receive the laser beam reflected by an object that is located at one side of the vehicle body, and after the laser receiving module receives the reflected laser beam, the laser receiving module correspondingly generates a laser sensing data. The laser receiving module is configured to transmit the laser sensing data to the processing device. In a process where the processing device controls the vehicle body to travel on the at least one rail along the travel direction, the image capture module continuously captures images and continuously transmits the image capture data to the processing device, the laser emitting module continuously emits the laser beam, and the laser receiving module continuously receives the reflected laser beam and continuously transmits the laser sensing data to the processing device. In the process where the processing device controls the vehicle body to travel on the at least one rail along the travel direction, the calculation module determines whether or not to change at least one of a travel speed and the travel direction of the vehicle body according to at least one of the image capture data and at least one of the laser sensing data.

In one aspect, the present disclosure provides a rail vehicle configured to travel on a rail. The rail vehicle includes a vehicle body, a processing device, and a visual sensing device. The vehicle body is configured to travel on the rail. The processing device is disposed on the vehicle body, and the processing device includes a communication module and a calculation module. The communication module is configured to be communicatively connected to a remote device. The communication module is configured to receive a travel data transmitted by the remote device. The calculation module is electrically connected to the communication module. When the communication module receives the travel data, the calculation module is configured to control the vehicle body to travel on the rail along a travel direction. The visual sensing device is disposed on the vehicle body. The visual sensing device is electrically connected to the processing device, and the visual sensing device includes an image capture module, a laser emitting module, and a laser receiving module. The image capture module is disposed on the vehicle body. The image capture module is configured to capture an image from one side of the vehicle body to generate an image capture data. The image capture module is configured to transmit the image capture data to the processing device. The laser emitting module is disposed on the vehicle body. The laser emitting module is disposed near the image capture module, and the laser emitting module is configured to emit a laser beam toward one side of the vehicle body. The laser receiving module is disposed on the vehicle body. The laser receiving module is disposed near the image capture module. The laser receiving module is configured to receive the laser beam reflected by an object that is located at one side of the vehicle body, and after the laser receiving module receives the reflected laser beam, the laser receiving module correspondingly generates a laser sensing data. The laser receiving module is configured to transmit the laser sensing data to the processing device. In a process where the processing device controls the vehicle body to travel on the rail along the travel direction, the image capture module continuously captures images and continuously transmits the image capture data to the processing device, the laser emitting module continuously emits the laser beam, and the laser receiving module continuously receives the reflected laser beam and continuously transmits the laser sensing data to the processing device. In the process where the processing device controls the vehicle body to travel on the rail along the travel direction, the calculation module determines whether or not to change at least one of a travel speed and the travel direction of the vehicle body according to at least one of the image capture data and at least one of the laser sensing data.

In one aspect, the present disclosure provides a visual sensing device configured to be disposed on a rail vehicle. The rail vehicle is configured to travel on a rail along a travel direction, and the rail vehicle includes a processing device. The visual sensing device includes a vision calculation module, an image capture module, a laser emitting module, a laser receiving module, and a connection unit. The image capture module is configured to capture an image from one side of the vehicle body to generate an image capture data. The image capture module is electrically connected to the vision calculation module. The image capture module is configured to transmit the image capture data to the vision calculation module. The laser emitting module is disposed near the image capture module. The laser emitting module is configured to emit a laser beam toward one side of the vehicle body. The laser receiving module is disposed near the image capture module. The laser receiving module is configured to receive the laser beam reflected by an object that is located at one side of the vehicle body, and after the laser receiving module receives the reflected laser beam, the laser receiving module correspondingly generates a laser sensing data. The laser receiving module is configured to transmit the laser sensing data to the vision calculation device. The connection unit is electrically connected to the vision calculation module. The connection unit is electrically connected to the processing device, and the connection unit is configured to transmit the image capture data and the laser sensing data to the processing device. The vision calculation module is configured to receive a start signal transmitted by the processing module through the connection unit. When the vision calculation module receives the start signal through the connection unit, the vision calculation module controls the image capture module, the laser emitting module, and the laser receiving module to be operated, and the vision calculation module transmits the image capture data and the laser sensing data to the processing device through the connection unit, so that when the rail vehicle travels, the processing device is configured to determine whether or not to change at least one of a travel speed and the travel direction according to the image capture data and the laser sensing data.

Therefore, by virtue of the rail vehicle system and the rail vehicle having the visual sensing device disposed thereon, when the rail vehicle travels along the rail, the rail vehicle does not easily collide with another rail vehicle or an obstacle in front of the rail vehicle. The visual sensing device of the present disclosure is suitable to be mounted on the rail vehicle, so that the rail vehicle does not easily collide with another rail vehicle or an obstacle when traveling along the rail.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
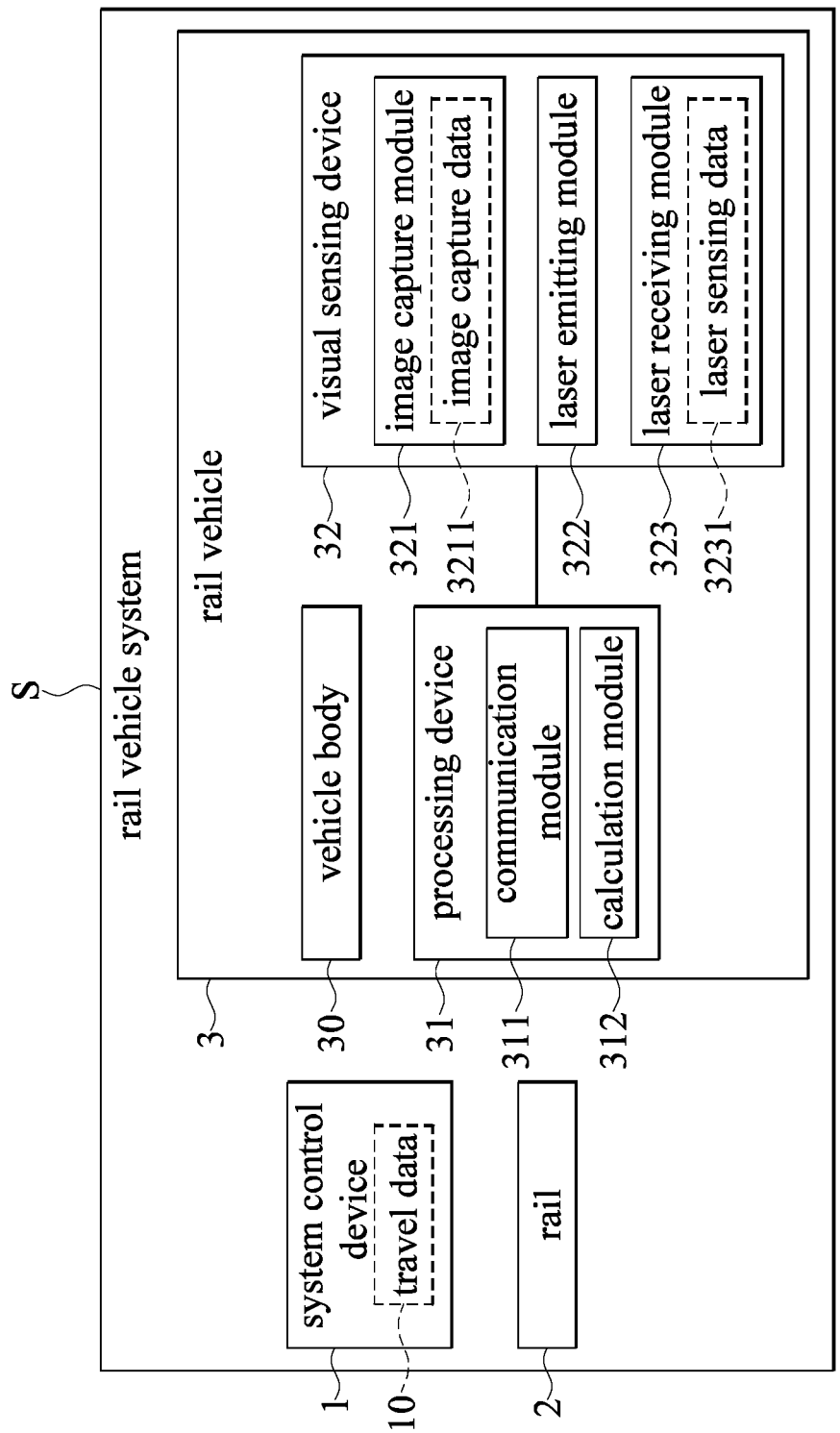
FIG. 1 is a block diagram of a rail vehicle system according to one embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 2:
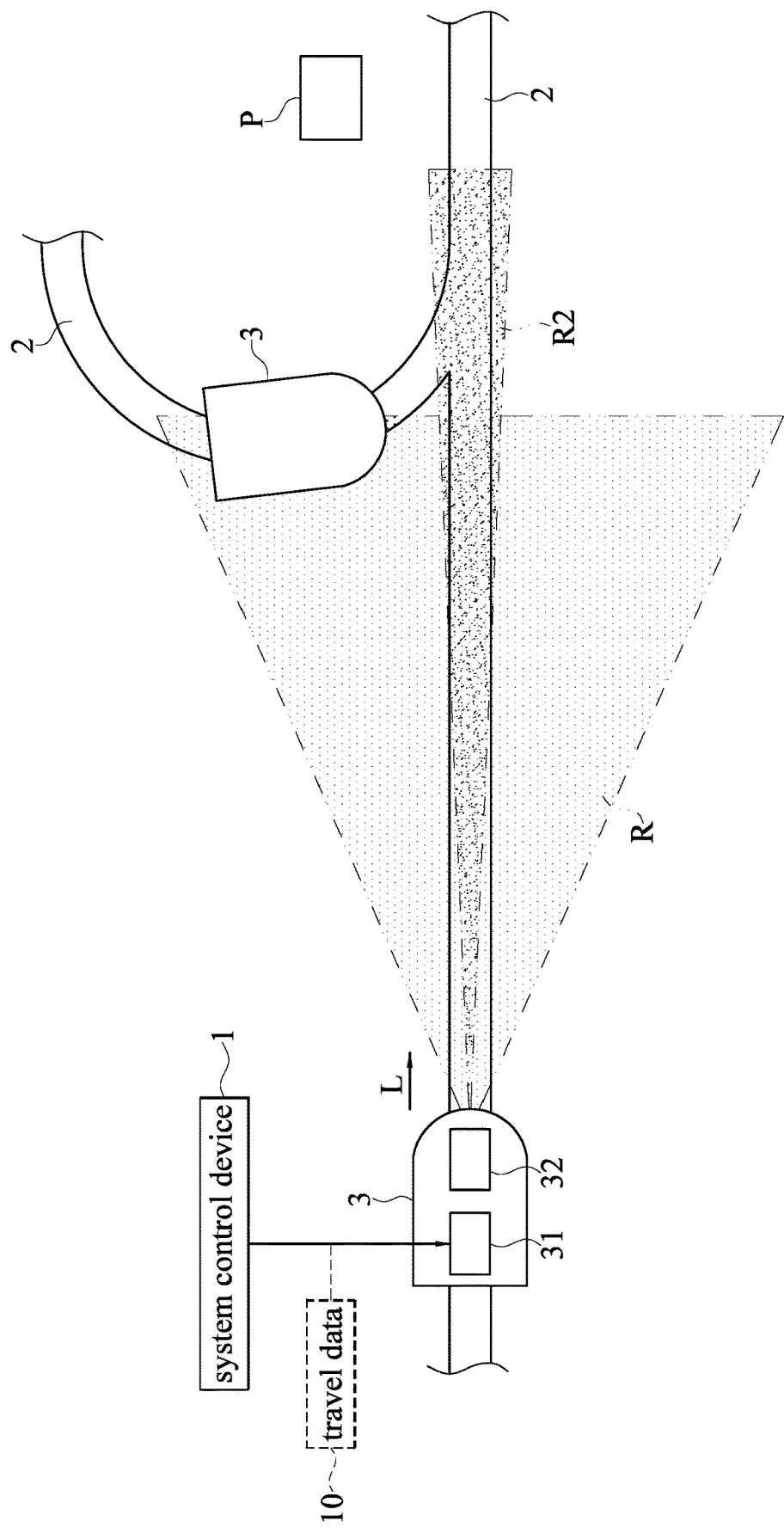
FIG. 2 is a schematic view of the rail vehicle system according to one embodiment of the present disclosure.

Referring to FIG. 1 and FIG. 2, FIG. 1 is a block diagram of a rail vehicle system according to one embodiment of the present disclosure, and FIG. 2 is a schematic view of the rail vehicle system according to one embodiment of the present disclosure. The present disclosure provides a rail vehicle system S including a system control device 1, a rail 2, and a rail vehicle 3. The rail vehicle system S in the present disclosure is suitable to be applied to various types of factories and manufacturing factory buildings (e.g., semiconductor manufacturing factory buildings). In a practical application, the system control device 1 can be an apparatus, such as various types of computers or servers, and the system control device 1, the rail 2, and the rail vehicle 3 can be disposed in the same factory building, but the present disclosure is not limited thereto. The system control device 1 can be not disposed in the factory building where both the rail 2 and the rail vehicle 3 are disposed, and the system control device 1 can be a remote server.

It should be noted that in other embodiments, the rail vehicle system S of the present disclosure can be provided without the system control device 1, and the rail vehicle 3 can be directly connected to an apparatus, such as a related computer or a server, disposed in the original factory building. That is to say, the system control device 1 can be replaced by equipment such as the related computer or the server disposed in the original factory building, and when the rail vehicle system S of the present disclosure is sold, the rail vehicle system S can include only the rail 2 and at least one rail vehicle 3. Naturally, when the system control device 1 is replaced by the computer or the server disposed in the original factory building, related software must be installed into the computer or the server so that the rail vehicle 3 can be in communication with the computer or the server in the original factory building.

The rail 2 is fixed in the factory building. The rail vehicle 3 is slidably disposed on the rail 2. In a practical application, the rail 2 can be disposed at a position near the floor or near the ceiling according to practical requirements, and the rail vehicle 3 can correspondingly travel at positions near the floor or near the ceiling along the rail 2. More specifically, the rail 2 and the rail vehicle 3 disposed near the floor can be similar to a rail guided vehicle (i.e., RGV), and the rail 2 and the rail vehicle 3 disposed near the ceiling can be similar to an overhead hoist transfer (i.e., OHT). The amount and the form of the rail 2 can be changed according to practical application, and the present disclosure is not limited thereto.

The system control device 1 is communicatively connected to the rail vehicle 3, and the system control device 1 is configured to control the rail vehicle 3 to travel along the rail 2. A wireless communication system used by the system control device 1 and the rail vehicle 3 is not limited in the present disclosure. For example, the system control device 1 and the rail vehicle can be in communication through various types of wireless communication system such as Wi-Fi or 5G.

The rail vehicle 3 includes a vehicle body 30, a processing device 31, and a visual sensing device 32. The vehicle body 30 is configured to travel along the rail 2. The vehicle body 30 can include an accommodating space configured to carry an object to be transferred, and the vehicle body 30 is configured to carry the object to be transferred. For example, the rail vehicle system S can be applied in a semiconductor manufactory factory building, the rail vehicle 3 can be used to carry a box having a plurality of wafers, and the box having the wafers can be transferred to different working stations with the rail vehicle 3 along the rail 2. A structure and a size of the vehicle body 30 can be designed according to a type or a form of the object to be transferred that is carried by the vehicle body 30, and the present disclosure is not limited thereto.

The processing device 31 is disposed on the vehicle body 30. The processing device 31 includes a communication module 311 and a calculation module 312. The communication module 311 is configured to be communicatively connected to the system control device 1, and the communication module 311 is configured to receive a travel data 10 transmitted by the system control device 1. For example, the communication module 311 can be various types of wireless communication chips (e.g., a WiFi chip or a 5G chip), but the present disclosure is not limited thereto. Primarily, the travel data 10 is a data for the system control device 1 to inform the rail vehicle 3 of where to travel along the rail 2. For example, a plurality of working stations can be disposed near the rail 2, and the system control device 1 can transmit the travel data 10 to the rail vehicle 3 so that the rail vehicle 3 can travel along the rail 2 to the working station determined by the system control device 1 according to the travel data 10.

The calculation module 312 is electrically connected to the communication module 311. The calculation module 312 can be various types of microprocessors or processing chips, but the present disclosure is not limited thereto. In a practical application, the communication module 311 and the calculation module 312 can be chips independent from each other, but the present disclosure is not limited thereto. In other embodiments, the communication module 311 and the calculation module 312 can be made into the same chip module.

After the communication module 311 receives the travel data 10 transmitted from the system control device 1, the communication module 311 transmits the travel data 10 to the calculation module 312. After the calculation module 312 receives the travel data 10, the calculation module 312 controls the vehicle body 30 to travel on the rail 2 along a travel direction according to the travel data 10. More specifically, the rail vehicle 3 can include a driving module disposed on the vehicle body 30. The driving device includes a plurality of wheels and at least one motor. The wheels are connected to the motor, and the motor is electrically connected to the calculation module 312. After the calculation module 312 receives the travel data 10, the motor is controlled to be operated so that the wheels synchronously rotate in the same direction and the rail vehicle 3 travels on the rail 2 along the travel direction. It should be noted that the rail vehicle 3 naturally includes a plurality of necessary devices for the vehicle body 30, the processing device 31, and the visual sensing device 32 to be normally operated such as an electric device and a brake device, the necessary devices are the same as related devices included by a conventional rail vehicle, and will not be reiterated therein.

The visual sensing device 32 is disposed on one end of the vehicle body 30. The visual sensing device 32 is electrically connected to the processing device 31. The visual sensing device 32 can be electrically connected to the processing device 31 in a wired manner or a wireless manner, and the visual sensing device 32 is configured to transmit data to the processing device 31. In a practical application, the visual sensing device 32 can receive an order transmitted by the processing device 31 and can perform a corresponding operation. For example, the processing device 31 can transmit a power-on order or a power-off order to the visual sensing device 32, and after the visual sensing device 32 receives the power-on order or the power-off order, the visual sensing device 32 is correspondingly switched on or switched off.

The visual sensing device 32 includes an image capture module 321, a laser emitting module 322, and a laser receiving module 323. The image capture module 321, the laser emitting module 322, and the laser receiving module 323 are disposed in front of the vehicle body 30. In a practical application, a quantity of the image capture module 321, the laser emitting module 322, and the laser receiving module 323 included by the visual sensing device 32 can be changed according to practical applications, and the present disclosure is not limited thereto.

The image capture module 321 is configured to capture an image in front of the vehicle body 30 so as to generate an image capture data 3211. The image capture module is configured to transmit the image capture data 3211 to the processing device 31. The image capture module 321 can include various types of photosensitive members, such as a charge coupled device (i.e., CCD) or a complementary metal-oxide semiconductor (i.e., CMOS), and the image capture module 321 can further include a lens and an image processing chip. Primarily, the image capture module 321 is configured to capture an image of a surrounding environment in front of or behind the vehicle body 30 of the rail vehicle 3. The image capture module 321 can transmit the image capture data 3211 to the processing device 31 in a wired manner or a wireless manner. In a practical application, an image capture scope (or a scope of vision) of the image capture module 321 can be selected according a laying method of the rail 2 or a size of each of the vehicle bodies 30.

The laser emitting module 322 is configured to emit a laser beam toward a front side of the vehicle body 30. The laser receiving module 323 is configured to receive the laser beam reflected by an object (e.g., another rail vehicle 3) in front of the vehicle body 30 and is configured to correspondingly generate a laser sensing data 3231. The laser receiving module 323 is configured to transmit the laser sensing data 3231 to the processing device 31. In a practical application, the laser emitting module 322 and the laser receiving module 323 can be made into the same module. The laser emitting module 322 and the laser receiving module 323 can also be independent from each other. In a practical application, a sensing range of the laser receiving module 323 can be selected according a laying method of the rail 2 or a size of each of the vehicle bodies 30.

Referring to FIG. 1 and FIG. 2, a practical operation method of the above-mentioned rail vehicle system S of the present disclosure is described as below. First, the system control device 1 transmits a travel data 10 to one of the rail vehicles 3 on the rail 2, and the travel data 10 includes a data about to which one of the working stations P the rail vehicle needs to travel. After the communication module 311 of the rail vehicle 3 receives the travel data 10, the communication module 311 transmits the travel data 10 to the calculation module 312, and the calculation module 312 controls the driving device of the rail vehicle 3 to be operated so that the vehicle body 30 travels on the rail 2 along a travel direction L in a predetermined speed.

In a process where the rail vehicle 3 travels along the travel direction L in the predetermined speed, at the same time, the processing device 31 controls the image capture module 321 to continuously capture images in front of the image capture module 321, and the image capture module 321 continuously transmits the image capture data 3211 to the processing device 31. In the process where the rail vehicle 3 travels along the travel direction L in the predetermined speed, at the same time, the processing device 31 further controls the laser emitting device 322 to continuously emit a laser beam along the travel direction L, the laser receiving module 323 continuously receives the reflected laser beam and continuously generates the laser sensing data 3231, and the laser receiving module 323 continuously transmits the laser sensing data 3231 to the processing device 31.

That is to say, in the process where the rail vehicle 3 travels along the travel direction L in the predetermined speed, at the same time, the processing device 31 controls the image capture module 321 and the laser emitting module 322 to be operated, and the processing device 31 continuously receives the image capture data 3211 and the laser sensing data 3231. When the calculation module 312 of the processing device 31 receives the image capture data 3211 and the laser sensing data 3231, the calculation module 312 determines whether or not to change at least one of the current travel speed and the current travel direction according to the current image capture data 3211 and the current laser sensing data 3231.

In a practical application, the calculation module 312 can take advantage of various types of image identification manners (e.g., various types of machine learning) to identify an object in the image capture data 3211 so as to determine whether any obstacles (e.g., another rail vehicle 3 or other obstacles) are on a travel path where the vehicle body 30 travels. When the calculation module 312 determines that another rail vehicle 3 or other obstacle is on the travel path of the vehicle body 30, the calculation module 312 correspondingly controls the brake device of the rail vehicle 3 to reduce the travel speed of the rail vehicle 3.

In the process where the rail vehicle 3 travels along the travel direction L, since the calculation module 312 receives the image capture data 3211 and the laser sensing data 3231 at the same time, and the calculation module 312 can further take advantage of the laser sensing data 3231 to determine a distance between another rail vehicle 3 (or an obstacle) on the travel path of the vehicle body 30 and the current rail vehicle 3. Therefore, the calculation module 312 can better determine whether to reduce the travel speed of the current rail vehicle 3.

For example, when the calculation module 312 determines that another rail vehicle 3 is in front of the rail vehicle 3 according to the image capture data 3211 and the calculation module 312 determines that a distance between the rail vehicle 3 and another rail vehicle 3 in front thereof is relatively long (e.g., greater than 5 meters, but the present disclosure is not limited thereto) according to the laser sensing data 3231, the calculation module 312 can maintain the current travel speed of the rail vehicle 3 without reducing the same. In contrast, when the calculation module 312 determines that another rail vehicle 3 is in front of the rail vehicle 3 according to the image capture data 3211 and the calculation module 312 determines that the distance between the rail vehicle 3 and another rail vehicle 3 is relatively short (e.g., lower than 5 meter, but the present disclosure is not limited thereto), the calculation module 312 can control the rail vehicle 3 to be decelerated or to be stopped.

Referring to FIG. 1 and FIG. 2, generally, a scope of vision R of the image capture module 321 is greater than a sensing range R2 of the laser receiving module 323 for receiving the laser beam. Therefore, when the rail vehicle 3 travels near a turning point of the rail 2 and another rail vehicle 3 is at the turning point of the rail 2, the calculation module 312 may determine that there is no another rail vehicle 3 on the travel path of the rail vehicle 3 according to the laser sensing data 3231, however, the calculation module 312 can correctly determine that another rail vehicle 3 is at the turning point of the rail 2 in front of the rail vehicle 3 according to the image capture data 3211, and the calculation module 312 can control the rail vehicle 3 to decelerate in time so as to prevent the rail vehicle 3 from colliding with another rail vehicle 3 in front thereof. In other words, in the rail vehicle system S of the present disclosure, when the rail vehicle 3 travels along the rail 2, the calculation module 312 determines whether or not to reduce or change at least one of the current travel speed and the current travel direction of the rail vehicle 3 at the same time according to the image capture data 3211 and the laser sensing data 3231, so as to effectively prevent the rail vehicle 3 from colliding with another rail vehicle 3 in front thereof. A frequency relative to an image capture speed of the image capture module 321 and a frequency relative to a laser beam emitting speed of the laser emitting module 322 can be designed according to the travel speed of the rail vehicle 3 on the rail 2, and the present disclosure is not limited thereto. In addition, the present disclosure does not limit a frequency for the calculation module 312 to read the image capture data 3211 and the laser sensing data 3231.

In the example above, the rail vehicle 3 is provided with one vision sensing module 32 disposed in front of the vehicle body 30, thereby allowing the rail vehicle 3 to determine whether there is an obstacle in front when the rail vehicle 3 travels. However, in a practical application, a quantity of the visual sensing device 32 disposed on the rail vehicle 3 is not limited to being one. In other embodiments, the rail vehicle 3 can be provided with two visual sensing devices 32 respectively disposed in front of and behind the vehicle body 30. Therefore, when the rail vehicle 3 travels along the rail 2, the processing device 31 can not only determine whether there is an obstacle in front on the rail 2 through the visual sensing device 32 disposed in front of the rail vehicle 3, the processing device 31 can also determine whether there is another rail vehicle 3 behind on the rail 2 through the visual sensing device 32 disposed behind the rail vehicle 3 so that at least one of the travel speed and the travel direction can be changed in time. Specifically, when the rail vehicle 3 takes advantage of the visual sensing device 32 in front of the vehicle body 30 to determine that there is no obstacle in front and the rail vehicle 3 takes advantage of the visual sensing device 32 behind the vehicle body 30 to determine that another rail vehicle 3 behind approaches in a high speed, the processing device 31 can control the rail vehicle 3 to accelerate so as to prevent from the rail vehicle 3 from colliding with another rail vehicle 3 behind. Naturally, at the same time, the processing device 31 can transmit a related warning signal to the system control device 1 or issue a related reminding signal (e.g., a light or a sound) to remind a related personnel of the current situation.

In other embodiments, the rail vehicle 3 can further include a velocity measuring device fixed on the vehicle body 30. The velocity measuring device is configured to measure a current velocity, including the travel direction and the travel speed, of the rail vehicle 3 to generate a velocity data. The velocity measuring device is electrically connected to the processing device 31, and the velocity measuring device is configured to transmit the velocity data to the processing device 31. Therefore, when the calculation module 312 determines whether or not to change at least one of the current travel direction and the current travel speed of the rail vehicle 3, the calculation module 312 can refer to the image capture data 3211, the laser sensing data 3231, and the velocity data at the same time to more accurately determine whether or not to change the at least one of the current travel direction and the current travel speed of the rail vehicle 3.

More specifically, in the process where the rail vehicle 3 travels along the rail 2, the calculation module 312 can take advantage of the image capture data 3211 in conjunction with various types of image identification manners such as machine learning and deep learning to predict the travel direction and the travel speed of another rail vehicle 3 in front of the rail vehicle 3. In addition, the calculation module 312 can take advantage of the laser sensing data 3231 to determine the distance between rail vehicle 3 and another rail vehicle 3 in front of the rail vehicle 3, and the calculation module 312 can determine the travel speed and the travel direction of the current rail vehicle 3 according to the velocity data. Therefore, the calculation module 312 can correctly determine whether the current travel speed and the travel direction are reduced or changed. For example, when the calculation module 312 determines, according to the image capture data 3211, the laser sensing data 3231, and the velocity data, that the travel direction of the rail vehicle 3 is the same as the travel direction of another rail vehicle 3 in front of the rail vehicle 3, the current travel speed of the rail vehicle 3 is lower than the travel speed of another rail vehicle 3 in front of the rail vehicle 3, and the distance between the rail vehicle 3 and another rail vehicle 3 in front of the rail vehicle 3 is relatively long (e.g., the distance is greater than 5 meter), the calculation module 312 can maintain the current travel speed of the rail vehicle 3 without reducing the same.

According to the above, in the process where the rail vehicle 3 travels on the rail 2 along the travel direction according to the travel data 10, the calculation module 312 determines whether or not to change at least one of the current travel speed and travel direction according to the image capture data 3211 and the laser sensing data 3231 so that the rail vehicle 3 is stopped, or the travel speed of the rail vehicle 3 is reduced or increased, and the calculation module 312 can control the rail vehicle 3 to be stopped and then control the rail vehicle 3 to travel in an opposite direction. In other words, in the process where the rail vehicle 3 travels forward along the rail 2, the calculation module 312 can determine whether the rail vehicle 3 is stopped, accelerated, or decelerated according to related data received by the calculation module 312, and after the calculation module 312 controls the rail vehicle 3 to be stopped, the calculation module 312 can further control the rail vehicle 3 to travel backwards. In the rail vehicle system S of the present disclosure, through the design of the visual sensing device 32 disposed on the rail vehicle 3, the rail vehicle 3 does not easily collide with another rail vehicle 3 or an obstacle in front when traveling along the rail 2.

It should be noted that in a conventional rail guided vehicle system (i.e., RGV system) or an overhead hoist transfer system (i.e., OHT system), after a rail vehicle of the RGV system or the OHT system receives a travel order transmitted by a related computer apparatus, the rail vehicle travels along a rail to a certain position according to the travel order. When the rail vehicle travels, a road condition in front of the rail vehicle is not inspected. Therefore, when an order of the related computer apparatus is incorrect or the related computer apparatus and the rail vehicle are in poor communication, a rear-end collision issue of the rail vehicle easily occurs. Also, when the rail vehicle travels and an obstacle is on a travel path of the rail vehicle, the rail vehicle easily collides with the obstacle. In contrast, in the rail vehicle system S of the present disclosure, when the rail vehicle 3 travels along the rail 2, the processing device 31 determines whether or not to change at least one of the travel direction and the travel speed of the rail vehicle 3 in time according to the image capture data 3211 and the laser sensing data 3231. Therefore, compared with the above conventional rail vehicle systems, even if the rail vehicle 3 and the system control device 1 are in poor communication, the rear-end collision issue of rail vehicles 3 of the rail vehicle system S of the present disclosure does not easily occur.

Figure 3:
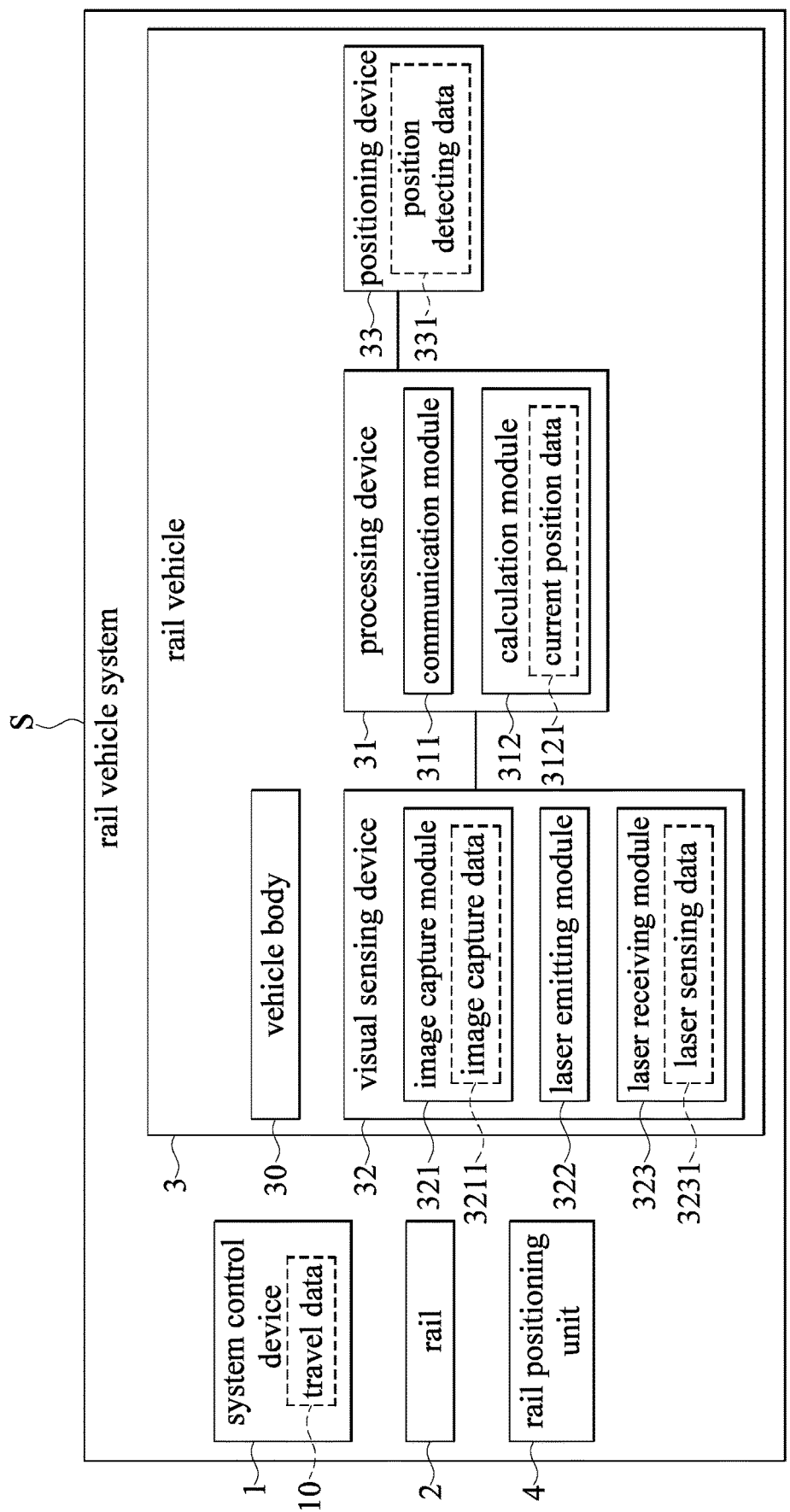
FIG. 3 is a block diagram of the rail vehicle system according to one embodiment of the present disclosure.
Figure 4:
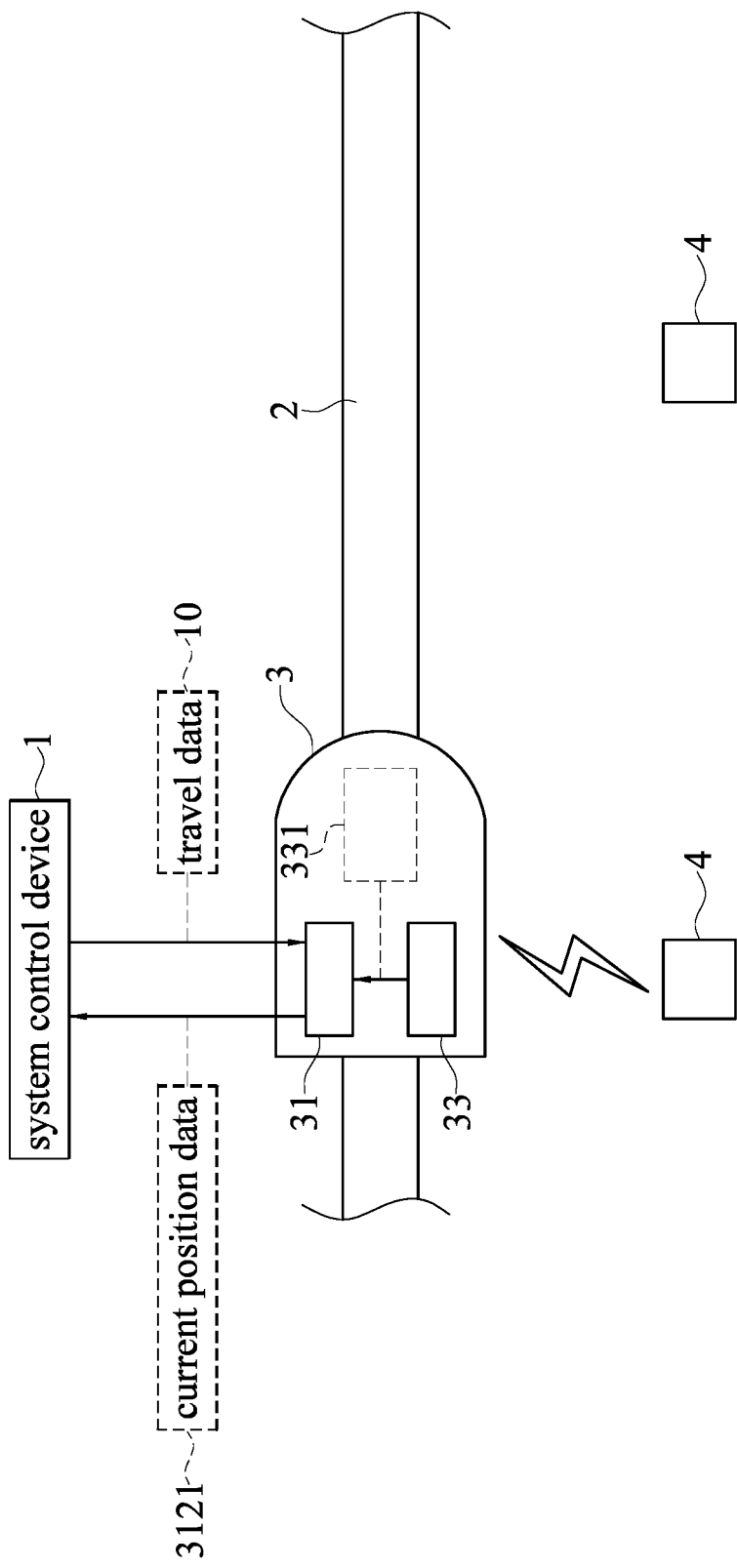
FIG. 4 is a schematic view of the rail vehicle system according to one embodiment of the present disclosure.

Referring to FIG. 3 and FIG. 4, FIG. 3 is a block diagram of the rail vehicle system according to one embodiment of the present disclosure, and FIG. 4 is a schematic view of the rail vehicle system according to one embodiment of the present disclosure. As shown in FIG. 3 and FIG. 4, the difference between the present embodiment and the previous embodiment is that the rail vehicle system S further includes a plurality of rail positioning units 4, and the rail vehicle 3 further includes a positioning device 33. The rail positioning units 4 are spaced apart at an outer periphery of the rail 2. The positioning device 33 is disposed on the vehicle body 30. A quantity of the rail positioning units 4 can be determined according to practical requirements, and the present disclosure is not limited thereto.

In the process where the vehicle body 30 travels on the rail 2, the positioning device 33 is configured to detect at least one of the rail positioning units 4 at an outer periphery of the vehicle body 30 so as to generate a position detecting data 331. The positioning device 33 is electrically connected to the processing device 31, and the positioning device 33 is configured to transmit the position detecting data 331 to the processing device 31. After the processing device 31 receives the position detecting data 331, the processing device 31 controls the communication module 311 to transmit a current position data 3121 to the system control device 1. After the system control device 1 receives the current position data 3121, the system control device 1 can be made aware of a current position of the rail vehicle 3.

That is to say, in the process where the rail vehicle 3 travels along the rail 2, the positioning device 33 disposed on the vehicle body 30 continuously detects different rail positioning units 4 disposed at the outer periphery of the rail 2, and the positioning device 33 continuously generates different position detecting data 331. The processing device 31 correspondingly and continuously generates different current position data 3121, the processing device 31 continuously transmits different current position data 3121 to the system control device 1, and the system control device 1 continuously updates the current position of the rail vehicle 3 according to the current position data 3121 continuously transmitted by the rail vehicle 3.

When the system control device 1 receives the current position data 3121 transmitted by the rail vehicle 3, the system control device 1 can transmit another travel data 10 to the rail vehicle 3, and the rail vehicle 3 can travel on the rail 2 according to another travel data 10. In a practical application, after the processing device 31 transmits the current position data 3121 to the system control device 1, a timer of the processing device 31 can start. When the processing device 31 does not receive another travel data 10 transmitted back by the system control device 1 in a predetermined time period, the processing device 31 controls the rail vehicle 3 to be decelerated or stopped. Therefore, a rear-end collision between the rail vehicle 3 and another rail vehicle 3 on the travel path of the rail vehicle 3 can be prevented.

It is worth mentioning that the position detecting data 331 can include a basic identification data of the corresponding one of the rail positioning units 4 detected by the positioning device 33 (e.g., a serial number of the rail positioning unit 4), and besides the position detecting data 331, the current position data 3121 can further include an identification data corresponding to the rail vehicle 3 (e.g., a serial number of the rail vehicle 3). That is to say, when the system control device 1 receives a current position data 3121, the system control device 1 can be made aware of which one of the rail vehicles 3 passes through which rail positioning unit 4 through the current position data 3121.

In one of the embodiments, each of the rail positioning units 4 can be a barcode (e.g., one-dimensional barcode or two-dimensional barcode), each of the barcodes can internally store a serial number data of the corresponding one of the rail positioning units 4, and the positioning device 33 disposed on the vehicle body 30 can be a barcode reader. When the vehicle body 30 passes through the corresponding one of the rail positioning units 4, the barcode reader (i.e., the positioning device 33) reads the barcode (i.e., the rail positioning unit 4), correspondingly obtains the serial number data internally stored in the barcode, and correspondingly generates the position detecting data 331 including the serial number data of the rail positioning unit 4. After the processing device 31 receives the position detecting data 331 including the serial number data of the rail positioning unit 4, the processing device 31 adds a rail vehicle serial number data to the position detecting data 331 so as to generate the current position data 3121.

Referring to FIG. 3 and FIG. 4, the rail vehicle system S of the present embodiment can be implemented as below. Firstly, when a rail vehicle 3 stops at a position on the rail 2, the system control device 1 transmits a travel data 10 to the rail vehicle 3. The rail vehicle 3 receives the travel data 10 and travels in a predetermined speed along a travel direction on the rail 2 according to the travel data 10. In a process where the rail vehicle 3 travels on the rail 2 according to the travel data 10, each time when the rail vehicle 3 passes through the rail positioning units 4, the rail vehicle 3 transmits a current position data 3121 to the system control device 1. After the rail vehicle 3 transmits the current position data 3121, the rail vehicle 3 is gradually decelerated or stopped. Until the rail vehicle 3 receives another travel data 10 transmitted back by the system control device 1, the rail vehicle 3 travels on the rail 2 according to another travel data 10. In other words, the rail vehicle 3 continuously transmits the current position data 3121 to the system control device 1 and continuously receives the travel data 10 transmitted by the system control device 1 to travel on the rail 2.

It should be noted that in a process where the processing device 31 of the rail vehicle 3 and the system control device 1 mutually transmit the current position data 3121 and the travel data 10, the visual sensing device 32 disposed on the rail vehicle 3 captures images and senses the laser beam at any time. In the process where the rail vehicle 3 travels on the rail 2 according to the travel data 10 transmitted by the system control device 1, when another rail vehicle 3 or an obstacle appears on the rail 2 and a rear-end collision may occur because of another rail vehicle 3 or the obstacle, the rail vehicle 3 is controlled by the processing device 31 to be decelerated or even stopped. That is to say, in the process where the rail vehicle 3 travels on the rail 2 according to the travel data 10, the processing device 31 determines whether or not to change at least one of the travel direction and the travel speed of the rail vehicle 3 according to the image capture data 3211 and the laser sensing data 3231, so as to prevent the rail vehicle 3 from colliding with another rail vehicle 3 or an obstacle on the travel path of the rail vehicle 3.

The vehicle body 30 of the rail vehicle 3 of the present disclosure is provided with the visual sensing device 32. Therefore, after the rail vehicle 3 transmits the current position data 3121 to the system control device 1, in response to the processing device 31 not receiving another travel data 10 transmitted back by the system control device 1 in the predetermined time period, or in response to the processing device 31 receiving another travel data 10 transmitted back by the system control device 1 after the predetermined time period, the rail vehicle 3 can determine whether or not to change at least one of the current travel direction and the current travel speed according to the current image capture data 3211 and the current laser sensing data 3231. When the rail vehicle 3 determines the current travel direction and the current travel speed of the rail vehicle 3 does not need to be changed according to the current image capture data 3211 and the current laser sensing data 3231, the rail vehicle 3 continuously travels on the rail 2. When the rail vehicle 3 encounters the next one of the rail positioning units 4, the rail vehicle 3 transmits the current position data 3121 to the system control device 1 again, and the processing device 31 determines whether the system control device 1 transmits back another travel data 10 in the predetermined time period again.

According to the above, in a practical application, when the processing device 31 transmits the current position data 3121 to the system control device 1 continuously for a number of times, and the processing device 31 does not receive another travel data 10 transmitted back by the system control device 1 continuously for a number of times, then the processing device 31 can directly control the rail vehicle 3 to be stopped, and the processing device 31 can issue a related alarm signal (e.g., emit a beam of specific light or make a specific sound) to inform relevant personnel that the current rail vehicle 3 cannot communicate normally with the system control device 1.

Referring to FIG. 1 and FIG. 5 to FIG. 8, FIG. 5 to FIG. 8 are correspondingly one of the embodiments of the rail vehicle system of the present disclosure. The difference between present embodiment and the previous embodiments is that the rail vehicle system S can include at least two rails respectively defined as a main line rail 2A and a branch line rail 2B, and the rail vehicle system S further includes a plurality of sign units 5.

One end of the branch line rail 2B is connected to one end of the main line rail 2A. The rail vehicle 3 traveling on the main line rail 2A can travel from the main line rail 2A to the branch line rail 2B, or the rail vehicle 3 traveling on the branch line rail 2B can travel from the branch line rail 2B to the main line rail 2A. In FIG. 5 to FIG. 8 of the present embodiment, the main line rail 2A is a straight rail, and the branch line rail 2B is a curved rail, but the present disclosure is not limited thereto.

The sign units 5 are disposed near a position where the main line rail 2A and the branch line rail 2B are connected with each other (hereinafter referred to as a junction W). In a practical application, the number and the positions of the sign units 5 disposed at an outer periphery of the junction W can be determined according to practical requirements and are not limited to that of FIG. 5 to FIG. 8. The sign units 5 can be fixed at the outer periphery of the rail 2 in each manner, or the sign units 5 can be fixed on the rail 2 as long as the sign units 5 do not affect the traveling rail vehicle 3. Regardless of the disposed positions of the sign units 5, the sign units 5 are in the scope of vision R of the image capture module 321 of the rail vehicle 3 traveling on the rail 2.

When the rail vehicle 3 travels on the main line rail 2A, the calculation module 312 of the rail vehicle 3 determines whether any one of the sign units 5 is in the scope of vision R of the image capture module 321 according to the image capture data 3211. When the calculation module 312 determines any one of the sign units 5 is in the scope of vision R according to the image capture data 3211, the calculation module 312 controls the vehicle body 30 to be stopped or changes the travel speed. Therefore, an issue of the rail vehicle 3 entering the junction W in a high speed and causing two rail vehicles 3 to collide with each other, or the rail vehicle 3 being unable to smoothly pass through the junction W, can be prevented.

In a practical application, the calculation module 312 of the rail vehicle 3 can take advantage of various types of conventional image identifying manners to determine whether any one of the sign units 5 appears in the image capture data 3211, and the calculation module 312 further determines whether or not to control the vehicle body 30 to be decelerated, or the calculation module 312 determines whether or not to control the vehicle body 30 to be stopped. A structure and a pattern of each of the sign units 5 can be designed according to practical requirements, and the present disclosure is not limited thereto.

Figure 5:
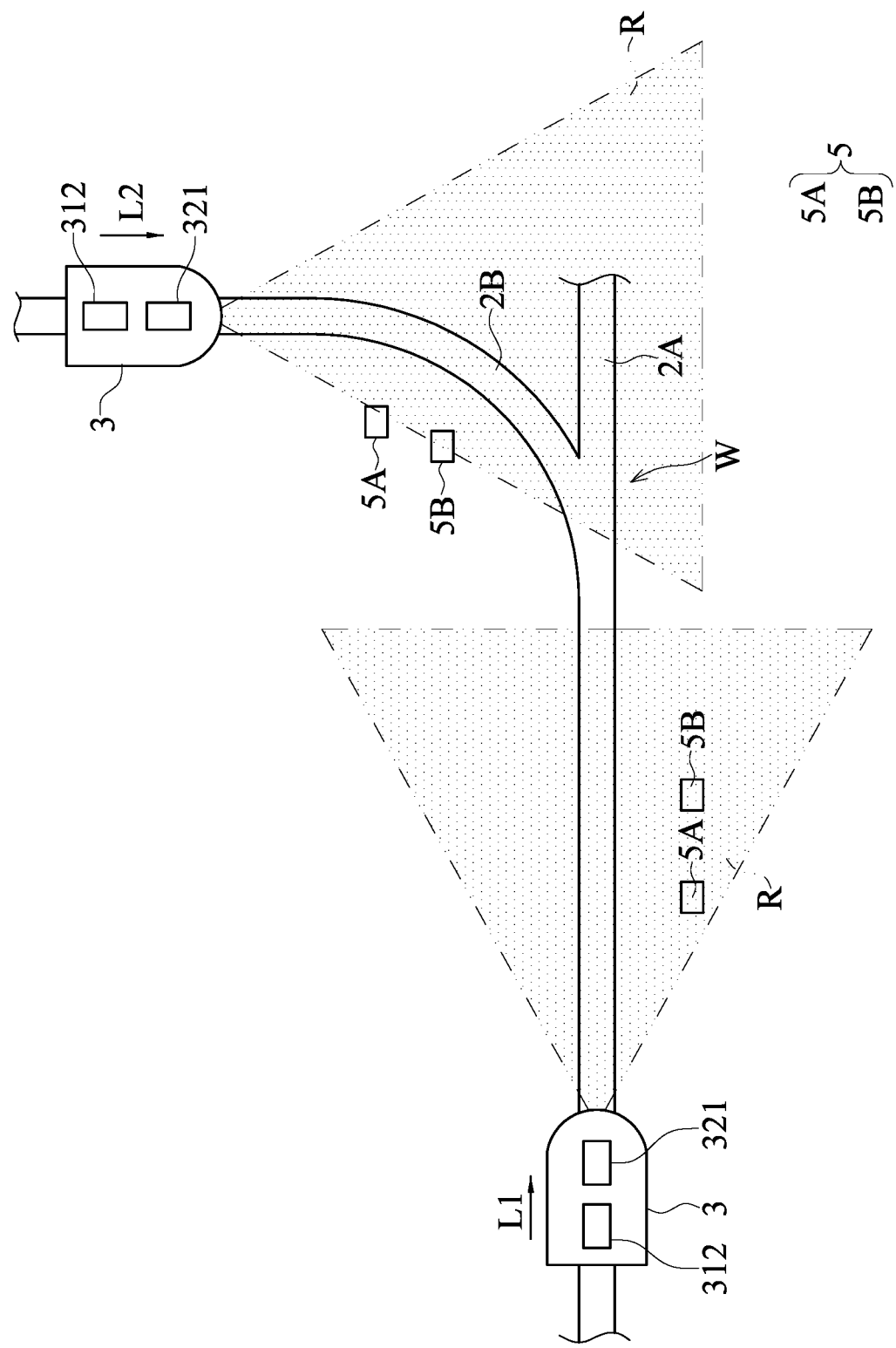
FIG. 5 is a schematic view of the rail vehicle system according to one embodiment of the present disclosure.

Referring to FIG. 1 and FIG. 5, in a practical application, four sign units 5 can be disposed at the outer periphery of the junction W, two of the four sign units 5 are defined as two first sign units 5A, and two of the four sign units 5 are defined as two second sign units 5B. One of the first sign units 5A and one of the second sign units 5B are disposed at an outer periphery of the main line rail 2A, and the other one of the first sign units 5A and the other one of the second sign units 5B are disposed at an outer periphery of the branch line rail 2B. The two second sign units 5B are disposed near the junction W, and the two first sign units 5A are disposed away from the junction W. The first sign units 5A and the second sign units 5B have different patterns, respectively.

When the calculation module 312 of the rail vehicle 3 traveling on the main line rail 2A determines one of the first sign units 5A is in the scope of vision R of the image capture module 321, the calculation module 312 can control the rail vehicle 3 to be decelerated. After the rail vehicle 3 slowly passes through the first sign unit 5A and the calculation module 312 determines one of the second sign units 5B is in the scope of vision R of the image capture module 321, the calculation module 312 can control the rail vehicle 3 to stop traveling and wait for a predetermined time period. Likewise, when the calculation module 312 of the rail vehicle 3 traveling on the branch line rail 2B determines one of the first sign units 5A is in the scope of vision R of the image capture module 321, the calculation module 312 can control the rail vehicle 3 to be decelerated. After the rail vehicle 3 slowly passes through the first sign unit 5A and the calculation module 312 determines one of the second sign units 5B is in the scope of vision R of the image capture module 321, the calculation module 312 can control the rail vehicle 3 to stop traveling and wait for a predetermined time period.

After the calculation module 312 controls the rail vehicle 3 to wait for the predetermined time period and before the calculation module 312 controls the vehicle body 30 to travel along the travel direction, the calculation module 312 determines whether another rail vehicle 3 is in front of the vehicle body 30 in advance according to the image capture data 3211 and the laser sensing data 3231. When the calculation module 312 determines another rail vehicle 3 is in front of the vehicle body 30, the calculation module 312 controls the vehicle body 30 to wait for another predetermined time period. When the calculation module 312 determines there is no another rail vehicle 3 in front of the vehicle body 30, the calculation module 312 controls the vehicle body 30 to pass through the junction W.

According to the above, in brief, the processing device 31 of each of the rail vehicles 3 controls the rail vehicle 3 to be stopped before passing through the position (i.e., junction W) where the two rails 2 are connected with each other according to the image capture data 3211, and the processing device 31 controls the rail vehicle 3 to travel again after the rail vehicle 3 waits for the predetermined time period. Before the processing device 31 controls the rail vehicle 3 to travel again, the processing device 31 determines whether another rail vehicle 3 or an obstacle is in front of the rail vehicle 3 according to the image capture data 3211 and the laser sensing data 3231 in advance, and the processing device 31 further determines whether the rail vehicle 3 can travel or not.

According to the above, in the rail vehicle system S of the present embodiment, through the sign units 5, an issue that two rail vehicles 3 traveling on two different rails 2 collide with each other at the junction W of the two rails 2 can be effectively prevented.

It is worth mentioning that in other embodiments, a pattern shown by each of the sign units 5 disposed at the outer periphery of the main line rail 2A can be different from a pattern shown by each of the sign units 5 disposed at the outer periphery of the branch line rail 2B. Therefore, the calculation module 312 can determine the rail vehicle 3 is currently on the main line rail 2A or the branch line rail 2B through the image capture data 3211. Since the calculation module 312 can determine the rail vehicle 3 is currently on the main line rail 2A or the branch line rail 2B, when the rail vehicle 3 on the main line rail 2A and the rail vehicle 3 on the branch line rail 2B are near the junction W at the same time, the rail vehicle 3 on the main line rail 2A (or the rail vehicle 3 on the branch line rail 2B) can pass through the junction W prior to the rail vehicle 3 on the branch line rail 2B (or the rail vehicle 3 on the main line rail 2A) according to practical requirements.

For example, when the calculation module 312 of the rail vehicle 3 on the main line rail 2A determines the sign units 5 corresponding to the main line rail 2A are in the image capture data 3211, the calculation module 312 can only decelerate the rail vehicle 3. When the calculation module 312 of the rail vehicle 3 on the branch line rail 2B determines the sign units 5 corresponding to the branch line rail 2B are in the image capture data 3211, the calculation module 312 controls the rail vehicle 3 to stop traveling and wait for a predetermined time period. Therefore, the rail vehicle 3 on the main line rail 2A passes through the junction W before the rail vehicle 3 on the branch line rail 2B passes through the junction W. Naturally, in other embodiments, the rail vehicle 3 on the branch line rail 2B can be designed to pass through the junction W before the rail vehicle 3 on the main line rail 2A passes through the junction W.

Figure 6:
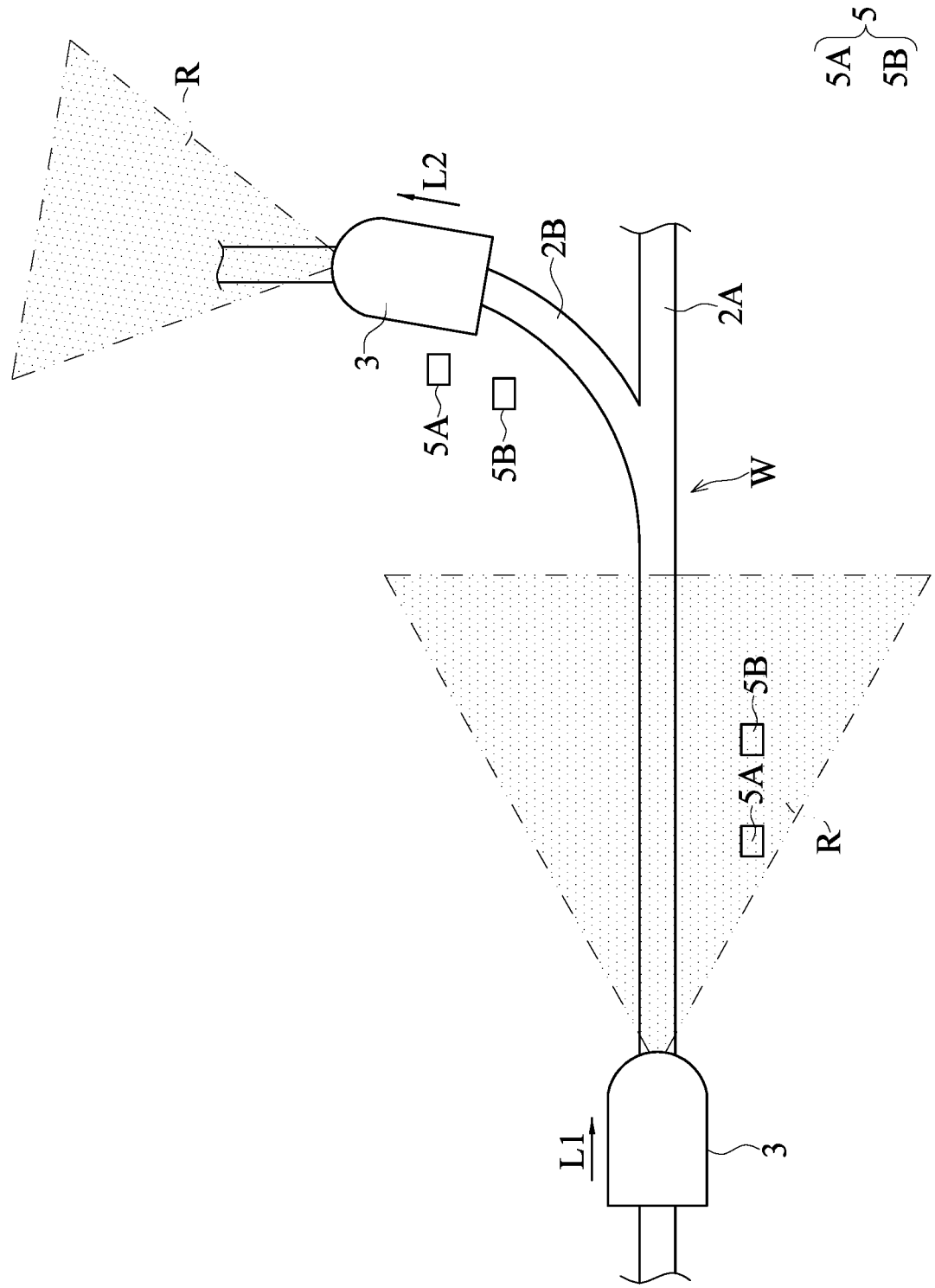
FIG. 6 is a schematic view of the rail vehicle system according to one embodiment of the present disclosure.
Figure 7:
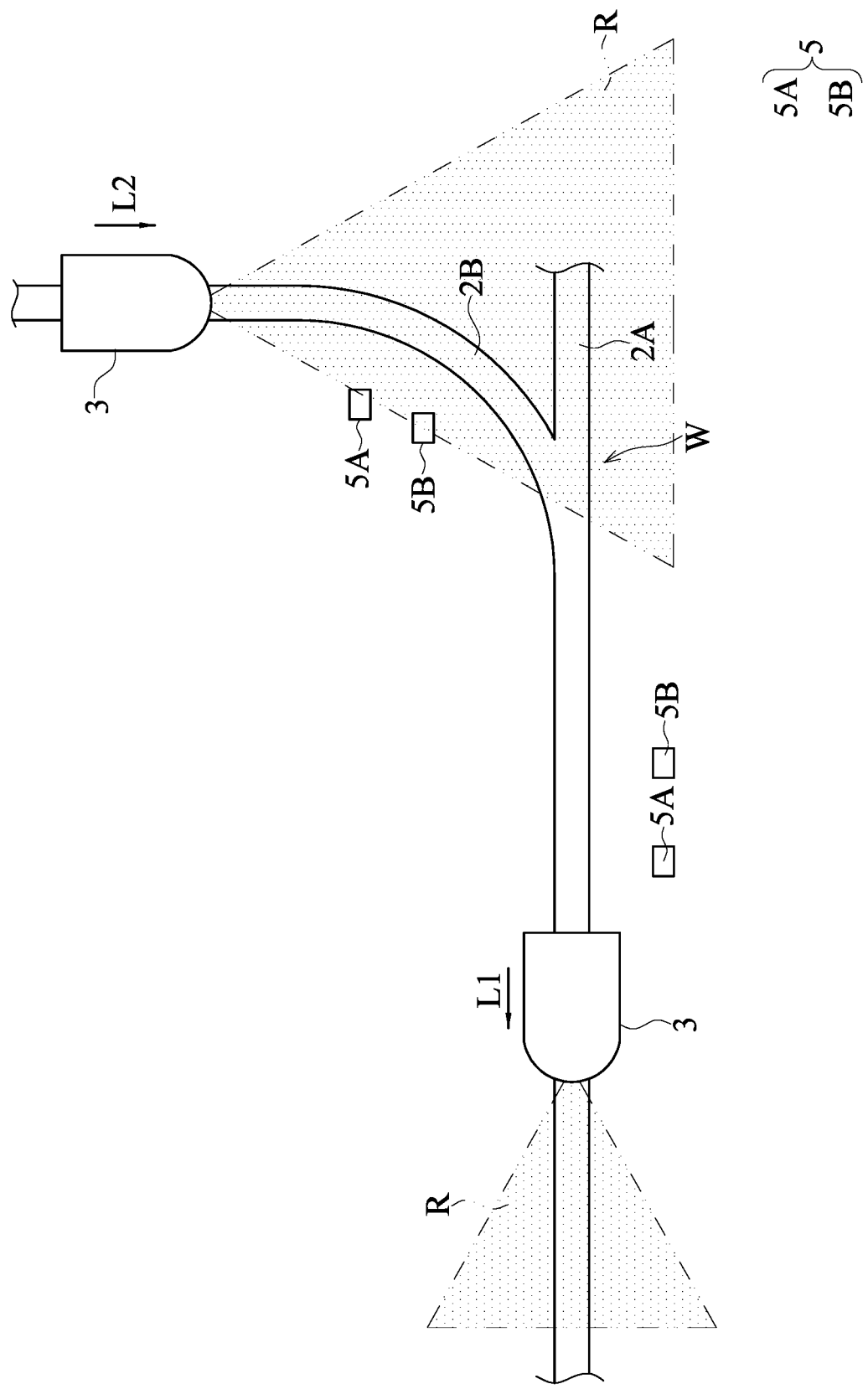
FIG. 7 is a schematic view of the rail vehicle system according to one embodiment of the present disclosure.
Figure 8:
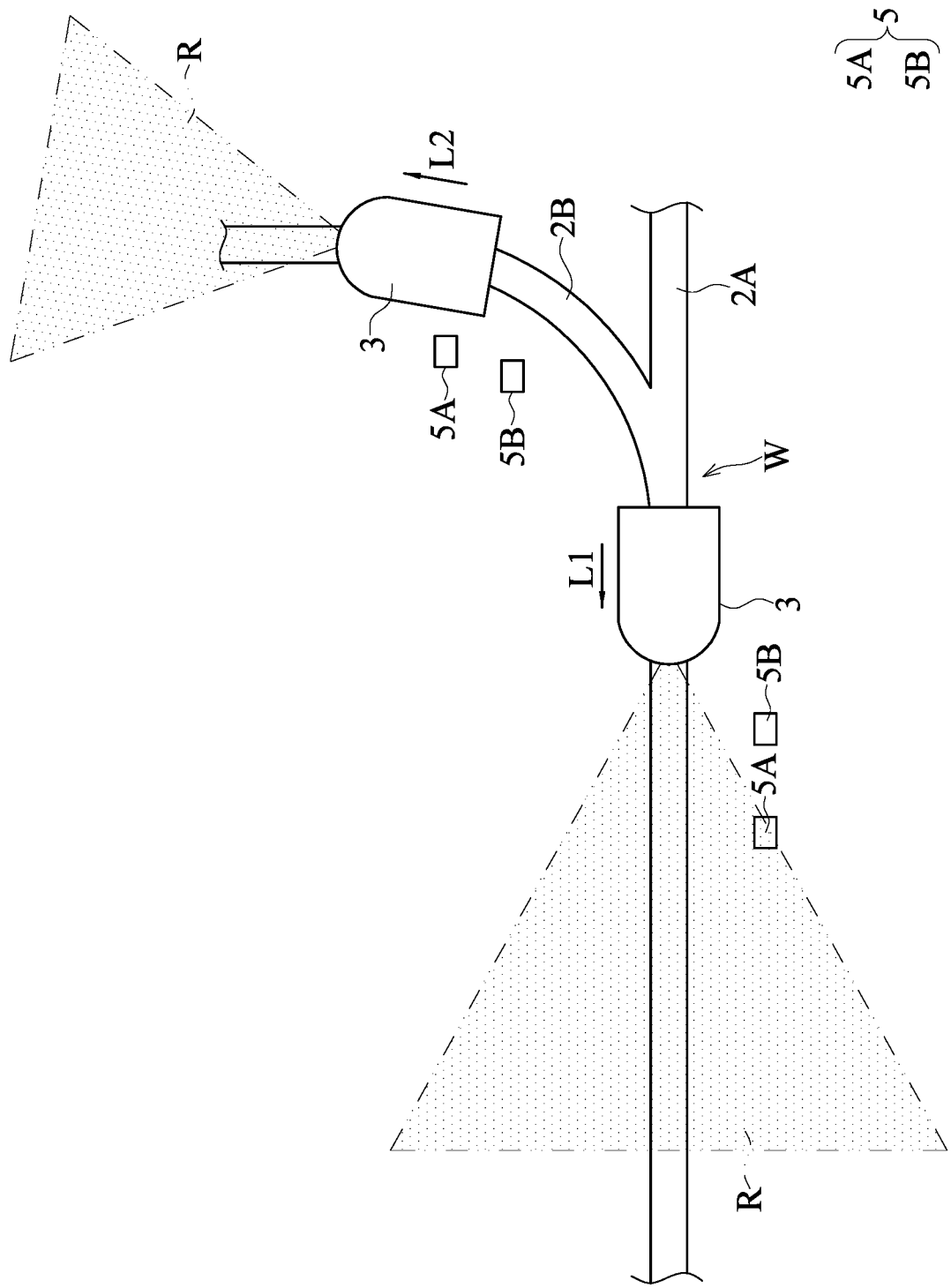
FIG. 8 is a schematic view of the rail vehicle system according to one embodiment of the present disclosure.

The travel direction of the rail vehicle 3 on the main line rail 2A and the travel direction of the rail vehicle 3 on the branch line rail 2B can be changed according to practical requirements. For example, as shown in FIG. 5, the travel direction L1 of the rail vehicle 3 on the main line rail 2A and the travel direction L2 of the rail vehicle 3 on the branch line rail 2B are toward the junction W. Also, as shown in FIG. 6, the travel direction L1 of the rail vehicle 3 on the main line rail 2A is toward the junction W, and the travel direction L2 of the rail vehicle 3 on the branch line rail 2B is away from the junction W. Also, as shown in FIG. 7, the travel direction L1 of the rail vehicle 3 on the main line rail 2A is away from the junction W, and the travel direction L2 of the rail vehicle 3 on the branch line rail 2B is toward the junction W. Also, as shown in FIG. 8, the travel direction L1 of the rail vehicle 3 on the main line rail 2A and the travel direction L2 of the rail vehicle 3 on the branch line rail 2B are away from the junction W.

In a practical application, the sign units 5 can include a plurality of light emitting units (e.g., light-emitting diodes), and the light emitting units of each of the sign units 5 can be controlled to show a specific pattern. Also, each of the sign units 5 can be only a sign having a specific pattern.

Figure 9:
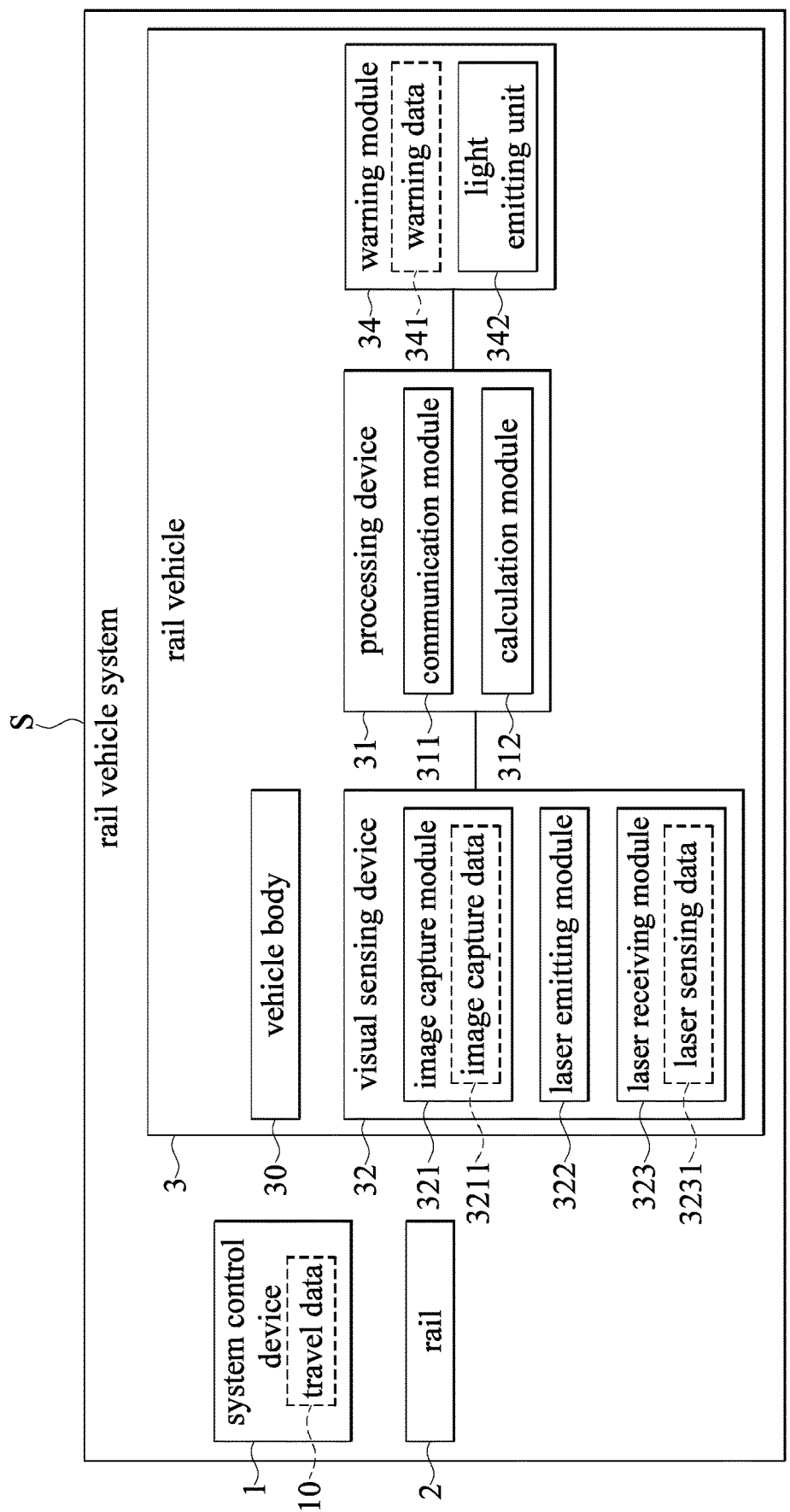
FIG. 9 is a block diagram of the rail vehicle system according to one embodiment of the present disclosure.
Figure 10:
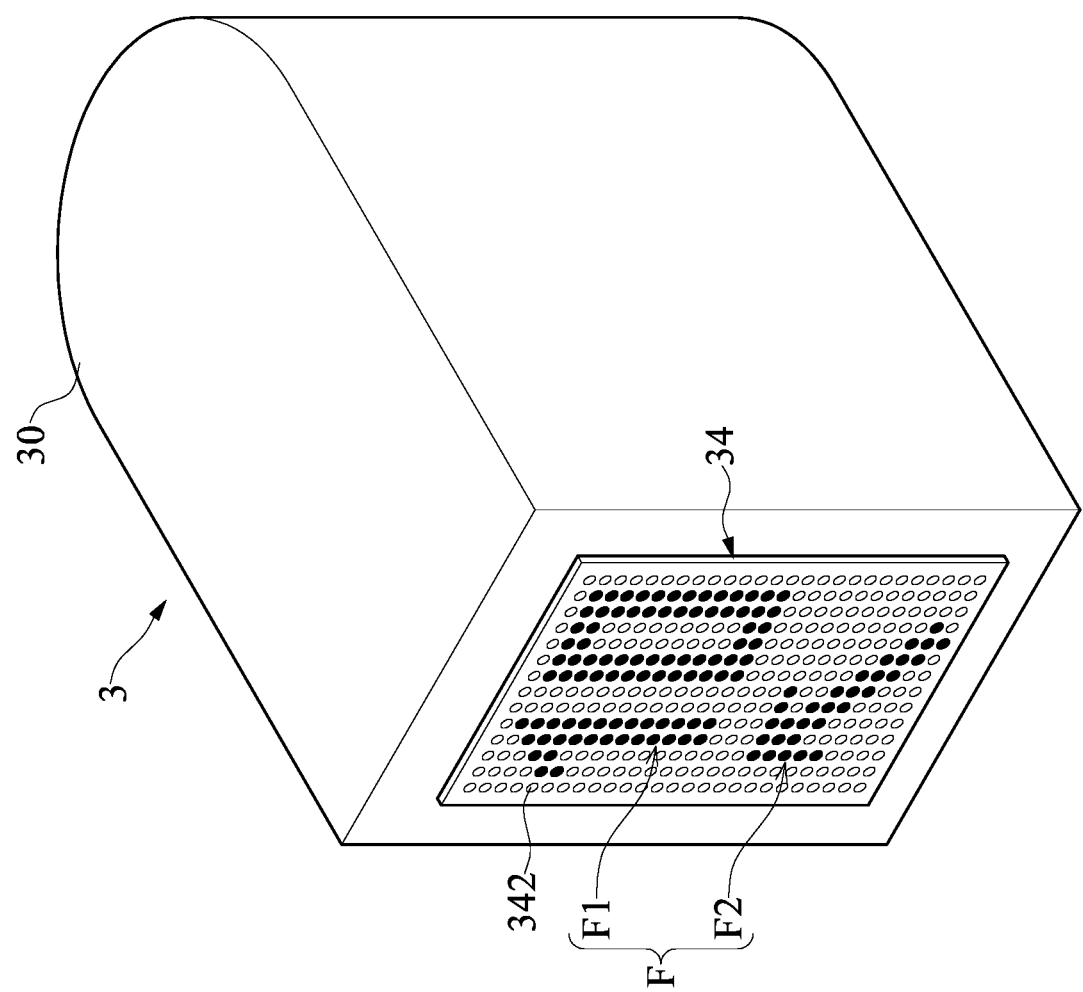
FIG. 10 is a schematic perspective view of a rail vehicle of the rail vehicle system according to one embodiment of the present disclosure.

Referring to FIG. 9 and FIG. 10, FIG. 9 is a block diagram of the rail vehicle system according to one embodiment of the present disclosure, and FIG. 10 is a schematic perspective view of a rail vehicle of the rail vehicle system according to one embodiment of the present disclosure. The difference between the present embodiment and the previous embodiments is that the rail vehicle 3 further includes a warning module 34. The warning module 34 is disposed on one end of the vehicle body 30 opposite to another end where the visual sensing device 32 is disposed. The warning module 34 is electrically connected to the processing device 31. When the calculation module 312 changes at least one of the travel speed and the travel direction of the vehicle body 30, the calculation module 312 controls the warning module 34 to generate a warning data 341.

More specifically, the warning module 34 can include a plurality of light emitting units 342. The calculation module 312 can control at least one of the light emitting units 342 to emit a beam of light according to at least one of the travel speed and the travel direction of the vehicle body 30 so that the beam of light emitted by the at least one of the light emitting units 342 forms a predetermined pattern F.

When the rail vehicle 3 travels along the rail 2, the calculation module 312 determines whether the predetermined pattern F is in a scope of vision of the image capture module 321 according to the image capture data 3211. When calculation module 312 determines the predetermined pattern F is in the scope of vision of the image capture module 321, the calculation module 312 changes at least one of the travel speed and the travel direction of the vehicle body 30. Naturally, in other embodiments, when the calculation module 312 determines the predetermined pattern F is in the scope of vision of the image capture module 321, the calculation module can maintain the travel speed and the travel direction of the vehicle body 30.

Referring to FIG. 10, in a practical application, the calculation module 312 controls the warning module 34 to generate the warning data 341, and the warning data 341 can be a current travel speed data F1 (e.g., the number 10 shown in FIG. 10) and a current travel direction data F2 (e.g., the arrow shown in FIG. 10) of the rail vehicle 3 shown by the light emitting units 342 that are controlled by the calculation module 312. Therefore, when the warning module 34 of one of the rail vehicles 3 is in the scope of vision of the image capture module 321 of another one of the rail vehicles 3, the calculation module 312 of the rail vehicle 3 behind can be made aware of the current travel speed and the current travel direction of the rail vehicle 3 in front thereof, and the calculation module 312 can control the current travel speed and the current travel direction of the rail vehicle 3 more accurately so as to further reduce a probability of the rail vehicles 3 colliding with each other. It should be noted that the travel speed data F1 and the travel direction data F2 shown in FIG. 10 are only one of the embodiments. In a practical application, the patterns showing the travel speed data F1 and the travel direction data F2 can be changed according to practical requirements as long as the patterns can be identified by another rail vehicle 3.

It should be noted that in one of the embodiments, the warning module 34 includes the light emitting units 342 and the calculation module 312 controls the light emitting units 342 to show the current travel speed and the current travel direction of the rail vehicle 3 in time, since the warning module 34 can show the travel speed data F1 and the travel direction data F2, when the calculation module 312 of another rail vehicle 3 reads the image capture data 3211, the calculation module 312 of another rail vehicle 3 can more quickly determine the current travel speed and the current travel direction of the rail vehicle 3 in front thereof. Therefore, the calculation module 312 of another rail vehicle 3 can be made aware of the current travel speed and the current travel direction of the rail vehicle 3 in front thereof without performing complicated calculation.

Figure 11:
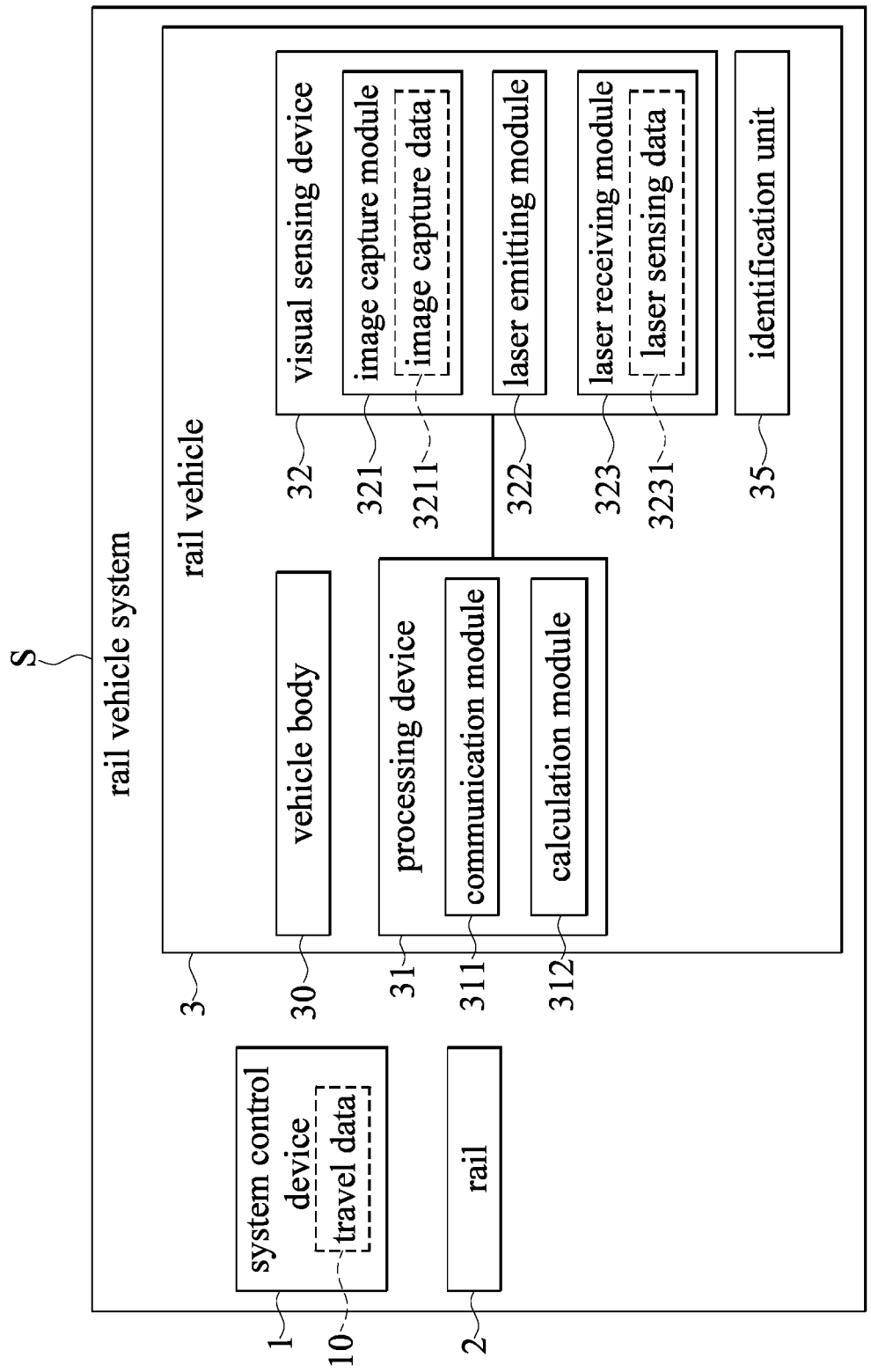
FIG. 11 is a block diagram of the rail vehicle system according to one embodiment of the present disclosure.
Figure 12:
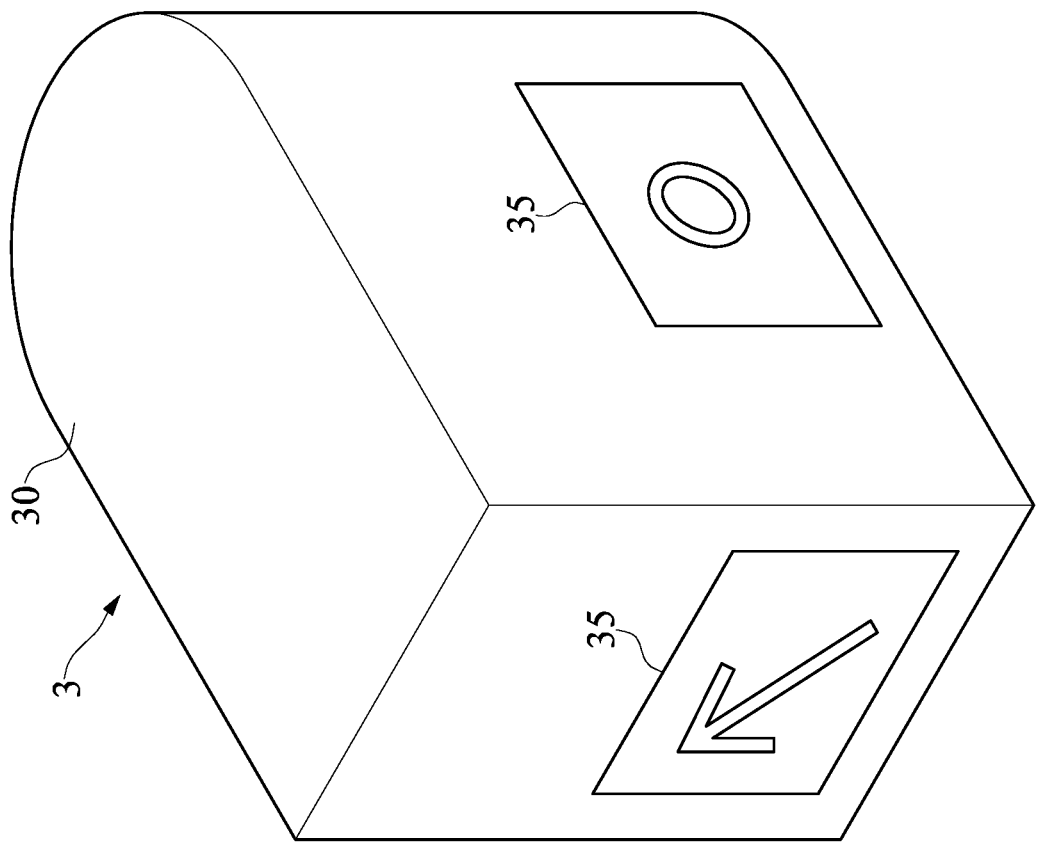
FIG. 12 is a schematic perspective view of the rail vehicle of the rail vehicle system according to one embodiment of the present disclosure.

Referring to FIG. 11 and FIG. 12, FIG. 11 is a block diagram of the rail vehicle system according to one embodiment of the present disclosure, and FIG. 12 is a schematic perspective view of the rail vehicle of the rail vehicle system according to one embodiment of the present disclosure. The difference between the present embodiment and the previous embodiments is that the rail vehicle 3 can further include an identification unit 35 disposed on one end of the rail vehicle 3. The calculation module 312 can determine whether the identification unit 35 disposed on another rail vehicle 3 is in a scope of vision of the image capture module 321 according to the image capture data 3211. When the calculation module 312 determines that the identification unit 35 disposed on another rail vehicle 3 is in the scope of vision of the image capture module 321, the calculation module 312 changes at least one of the travel speed and the travel direction of the vehicle body 30. More specifically, the identification unit 35 can be a planar or stereoscopic sign, and primarily, the identification unit 35 is configured to allow another rail vehicle 3 to identify the travel direction of the rail vehicle 3. For example, the identification unit 35 can be a sticker having a specific pattern or a specific pattern that is a recess or a protrusion formed on a shell of the vehicle body 30. The specific pattern can be designed according to practical requirements, and the present disclosure is not limited thereto.

In other embodiments, the rail vehicle 3 can be provided with two or more than two identification units 35 disposed on the rail vehicle 3. In addition, the identification units 35 disposed on different positions of the rail vehicle 3 can have different patterns or different structures, and the calculation module 312 of the rail vehicle 3 can determine the current travel direction and a structure of the rail vehicle 3 in the scope of vision of the image capture module 321 through image identification so as to determine whether or not to change at least one of the current travel direction and the current travel speed of the rail vehicle 3.

For example, the identification units 35 having different patterns can be disposed on a front portion, a rear portion, a left portion, and a right portion of the vehicle body 30 of the rail vehicle 3. When the calculation module 312 of another rail vehicle 3 near the rail vehicle 3 reads the image capture data 3211 and determines the identification unit 35 disposed on the front portion (or the rear portion) of the vehicle body 30 of another rail vehicle 3 is in the scope of vision of the image capture module 321, the calculation module 312 determines that another rail vehicle 3 travels toward (or away from) the rail vehicle 3. When the calculation 312 determines the identification unit 35 disposed on the left portion or the right portion of the vehicle body 30 of another rail vehicle 3 is in the scope of vision of the image capture module 321, the calculation module 312 determines that another rail vehicle 3 is turning left or turning right. When the calculation module 312 determines that the identification unit 5 disposed on the left portion (or the right portion) and the identification unit 5 disposed on the front portion of the vehicle body 30 of another rail vehicle 3 are in the scope of vision of the image capture 321, the calculation module 312 determines that another rail vehicle 3 is turning left (or turning right) and gradually travels toward the rail vehicle 3. When the calculation module 312 determines that the identification unit 5 disposed on the left portion (or the right portion) and the identification unit 5 disposed on the rear portion of the vehicle body 30 of another rail vehicle 3 are in the scope of vision of the image capture 321, the calculation module 312 determines that another rail vehicle 3 is turning left (or turning right) and gradually travels away from the rail vehicle 3.

According to the above, since the vehicle body 30 is provided with at least one identification unit 35 disposed thereon, the calculation module 312 of the rail vehicle 3 can more clearly determine the travel direction of another rail vehicle 3 in the scope of vision of the image capture module 321 of the rail vehicle 3 so that the calculation module 312 can perform a better control to prevent the rail vehicle 3 from colliding with another rail vehicle 3.

It should be noted that a quantity of the warning module 34 in the previous embodiment (as shown in FIG. 9) can be more than one. The warning modules 34 can be disposed on different surfaces of the vehicle body 30 as the above description, and the warning modules 34 can correspondingly show different patterns. Therefore, the rail vehicle 3 can determine the current travel direction and the structure of another rail vehicle 3 according to the different patterns shown by different warning modules 34 in the image capture data 3211.

Figure 13:
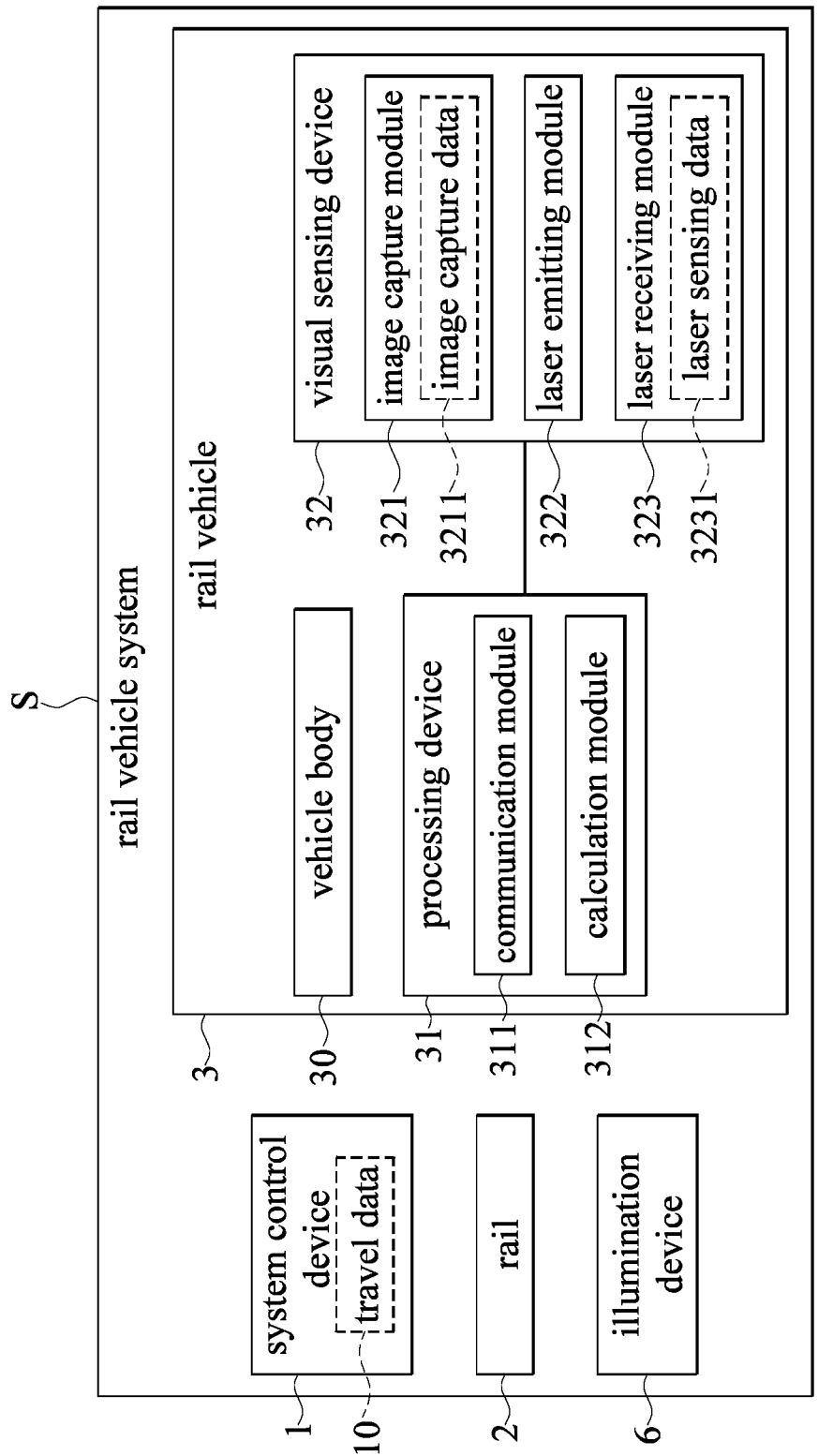
FIG. 13 is a block diagram of the rail vehicle system according to one embodiment of the present disclosure.

Referring to FIG. 13, FIG. 13 is a block diagram of the rail vehicle system according to one embodiment of the present disclosure. The difference between the present embodiment and the previous embodiments is that the rail vehicle 3 can further include an illumination device 6 disposed on the vehicle body 30. The illumination device 6 is electrically connected to the processing device 31. The processing device 31 is configured to control the illumination device 6 to emit a beam of light toward the front of the vehicle body 30. Primarily, the illumination device 6 is configured to provide a light source for the image capture module 321 to capture images in front of the rail vehicle 3. In the rail vehicle system S of one of the embodiments of the present disclosure, each of the rail vehicles 3 is provided with the illumination device 6, and the rail vehicle system S can be applied to a lights-out factory (i.e., the factory building is basically in a light-out state without illumination) to save energy.

It should be noted that in a practical application, the rail vehicle system S can include at least one of the rail positioning unit 4, the sign unit 5, the positioning device 33, the warning module 34, the identification unit 35, and the illumination device 6 in the above embodiments.

Figure 14:
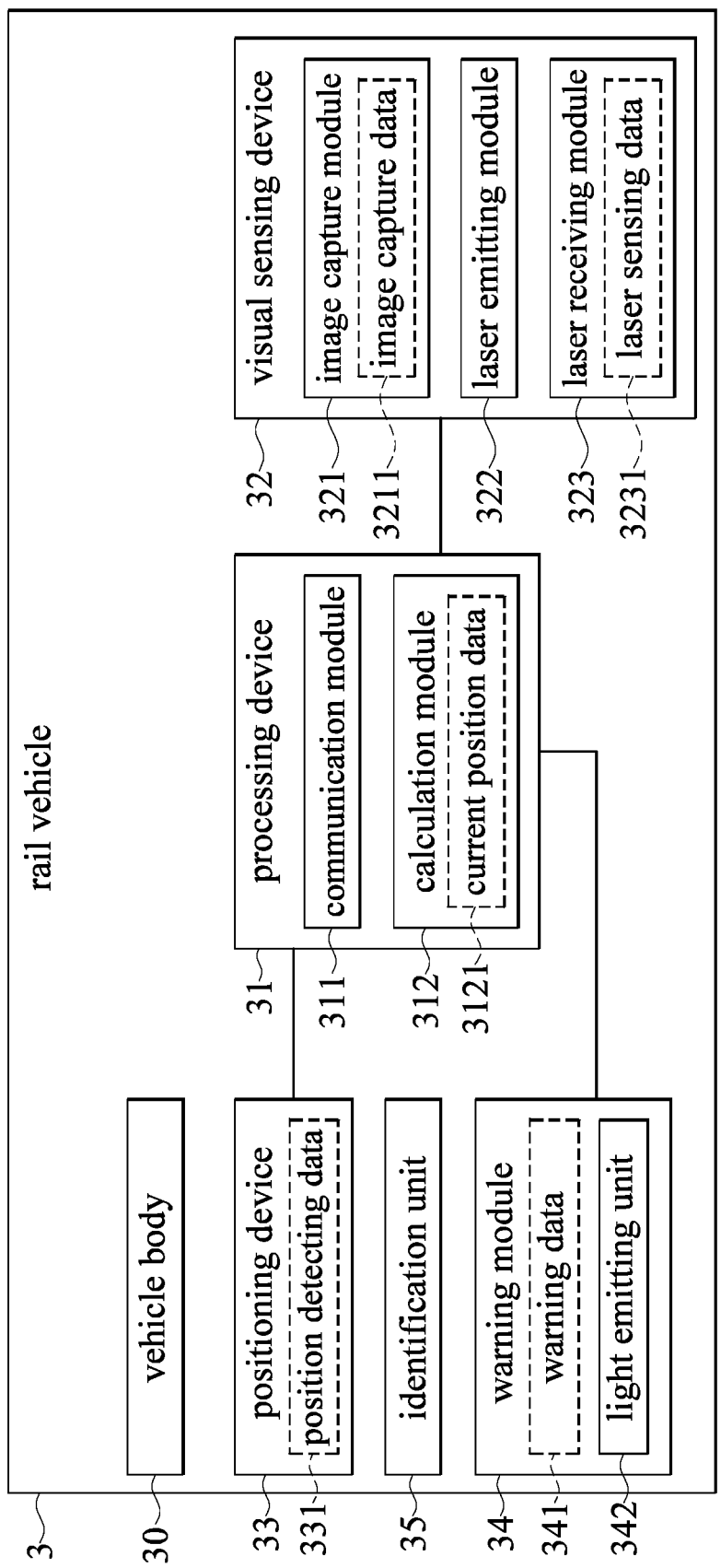
FIG. 14 is a block diagram of the rail vehicle according to one embodiment of the present disclosure.

Referring to FIG. 14, FIG. 14 is a block diagram of the rail vehicle according to one embodiment of the present disclosure. The rail vehicle 3 of the present disclosure at least includes a vehicle body 30, a processing device 31, and a visual sensing device 32. The processing device 31 includes a communication module 311 and a calculation module 312. The vision sensing module 32 includes an image capture module 321, a laser emitting module 322, and a laser receiving module 323. The communication module 311 is configured to be communicatively connected to a remote device, and the communication module 311 is configured to receive a travel data transmitted by the remote device. The remote device can be various types of computers or servers or the system control device 1 (as shown in FIG. 1) in the previous embodiment.

In a practical application, the rail vehicle 3 of the present disclosure can include at least one of the positioning device 33, the warning module 34, and the identification unit 35 according to practical requirements. The rail vehicle 3 of the present disclosure and each of the modules, devices and units included by the rail vehicle 3 have been described in the previous embodiments, and will not be reiterated herein. The rail vehicle 3 of the present disclosure can be independently sold and manufactured, and the rail vehicle 3 of the present disclosure is not limited to be sold or manufactured with other components and devices of the rail vehicle system in the previous embodiments.

Figure 15:
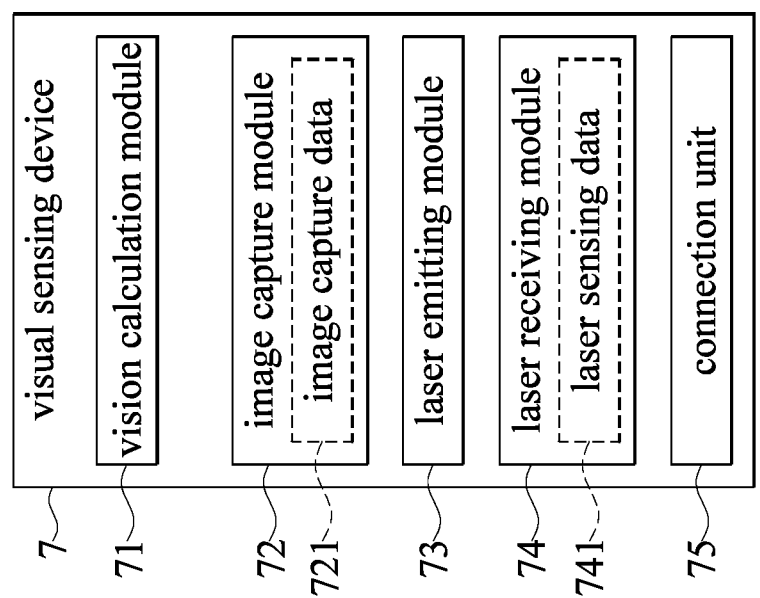
FIG. 15 is a block diagram of a visual sensing device according to one embodiment of the present disclosure.

Referring to FIG. 15, FIG. 15 is a block diagram of a visual sensing device according to one embodiment of the present disclosure. The visual sensing device 7 of the present disclosure is configured to be disposed on one end of a rail vehicle, the rail vehicle is configured to travel on a rail along a travel direction, and the rail vehicle includes a processing device. The rail vehicle can be various types of conventional RGV or an OHT rail vehicle. The rail vehicle can also be the rail vehicle in the previous embodiments.

The visual sensing device 7 includes a vision calculation module 71, an image capture module 72, a laser emitting module 73, a laser receiving module 74, and a connection unit 75. The image capture module 72, the laser emitting module 73, the laser receiving module 74, and the connection unit 75 are electrically connected to the vision calculation module 71. The detail description of the image capture module 72, the laser emitting module 73, and the laser emitting module 74 can be referred to the description of the image capture module 321, the laser emitting module 322, and the laser receiving module 323 in the previous embodiments (as shown in FIG. 1 to FIG. 13), and will not be reiterated herein. The vision calculation module 71 in the present embodiment and the calculation module 312 in the previous embodiments (as shown in FIG. 1 to FIG. 13) have the same function, and will not be reiterated herein.

The connection unit 75 is configured to be connected to the processing device. The connection unit 75 is configured to transmit an image capture data 721 generated by the image capture module 72 and a laser sensing data 741 generated by the laser receiving module 74 to the processing device of the rail vehicle. The vision calculation module 71 is configured to receive a start signal transmitted by the processing device through the connection unit 75.

When the connection unit 75 receives the start signal, the vision calculation module 71 controls the image capture module 72, the laser emitting module 73, and the laser receiving module 74 to be operated, and the vision calculation module 71 controls the connection unit 75 to transmit the image capture data 721 and the laser sensing data 741 to the processing device. Therefore, when the rail vehicle travels, the processing device determines whether or not to change at least one of a travel speed and a travel direction of the rail vehicle according to the image capture data 721 and the laser sensing data 741.

Primarily, the connection unit 75 allows the processing device of the rail vehicle to be electrically connected to the vision calculation module 71 of the visual sensing device 7. A structure of the connection unit 75 can be designed according to practical requirements. For example, the connection unit 75 can include a connection wire and two connectors. The two connectors are disposed at two ends of the connection wire. One of the connectors is mated with a corresponding socket in the vision calculation module 71, and the other one of the connectors is mated with a corresponding socket in the processing device. The connection unit 75 can also be a communication chip, and the processing device can be in communication with the visual sensing device 7 in a wireless manner.

In a practical application, the vision calculation module 71 of the visual sensing device 7 can determine whether another rail vehicle or an obstacle is in a scope of vision of the image capture module 72 and a sensing range of the laser receiving module 74 according to the image capture data 721 and the laser sensing data 741 so as to generate a stop data or a deceleration data, and the vision calculation module 71 can transmit the stop data or the deceleration data to the processing device of the rail vehicle. When the processing device of the rail vehicle receives the stop data or the deceleration data, the processing device can correspondingly control the rail vehicle to be stopped or decelerated.

That is to say, in a practical application, the vision calculation module 71 of the visual sensing device 7 can autonomously determine whether another rail vehicle or an obstacle is in front of the rail vehicle according to the image capture data 721 and the laser sensing data 741. Therefore, the vision calculation module 71 of the visual sensing device 7 can transmit a related signal to the rail vehicle so that the rail vehicle can be stopped or decelerated. In other embodiments, the visual sensing device 7 can be only used to generate and transmit the image capture data 721 and the laser sensing data 741 to the processing device.

In conclusion, through the rail vehicle system, the rail vehicle, and the visual sensing device of the present disclosure, a probability of two rail vehicles traveling on the rail colliding with each other can be effectively decreased. In addition, even if the rail vehicles and the system control device (or a central computer apparatus or a central server in the factory building) are in poor communication, it can be ensured that the rail vehicles on the rail do not easily collide with each other.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A rail vehicle system, comprising:
   a system control device;
   at least one rail, and
   at least one rail vehicle including:
     a vehicle body configured to travel on the at least one rail;
     a processing device disposed on the vehicle body, wherein the processing device includes:
       a communication module configured to be communicatively connected to the system control device, wherein the communication module is configured to receive a travel data transmitted by the system control device; and
       a calculation module electrically connected to the communication module, wherein when the communication module receives the travel data, the calculation module is configured to control the vehicle body to travel on the at least one rail along a travel direction; and
     at least one visual sensing device disposed on the vehicle body, wherein the at least one visual sensing device is electrically connected to the processing device, and the at least one visual sensing device includes:
       an image capture module disposed on the vehicle body, wherein the image capture module is configured to capture an image from one side of the vehicle body to generate an image capture data, and wherein the image capture module is configured to transmit the image capture data to the processing device;
       a laser emitting module disposed on the vehicle body, wherein the laser emitting module is disposed near the image capture module, and the laser emitting module is configured to emit a laser beam toward one side of the vehicle body; and
       a laser receiving module disposed on the vehicle body, wherein the laser receiving module is disposed near the image capture module, wherein the laser receiving module is configured to receive the laser beam reflected by an object that is located at one side of the vehicle body, and after the laser receiving module receives the reflected laser beam, the laser receiving module correspondingly generates a laser sensing data, and wherein the laser receiving module is configured to transmit the laser sensing data to the processing device,
   wherein in a process where the processing device controls the vehicle body to travel on the at least one rail along the travel direction, the image capture module continuously captures images and continuously transmits the image capture data to the processing device, the laser emitting module continuously emits the laser beam, and the laser receiving module continuously receives the reflected laser beam and continuously transmits the laser sensing data to the processing device, and
   wherein in the process where the processing device controls the vehicle body to travel on the at least one rail along the travel direction, the calculation module determines whether or not to change at least one of a travel speed and the travel direction of the vehicle body according to at least one of the image capture data and at least one of the laser sensing data.

2. The rail vehicle system according to claim 1, further comprising a plurality of rail positioning units spaced apart at an outer periphery of the at least one rail, wherein the at least one rail vehicle further includes a positioning device disposed on the vehicle body, wherein when the vehicle body travels on the at least one rail, the positioning device is configured to detect each of the rail positioning units at an outer periphery of the vehicle body to correspondingly generate a position detecting data, wherein the positioning device is electrically connected to the processing device, and the positioning device is configured to transmit the position detecting data to the processing device, and wherein after the processing device receives the position detecting data, the processing device is configured to control the communication module to transmit a current position data to the system control device.

3. The rail vehicle system according to claim 2, wherein after the processing device transmits the current position data to the system control device, in response to the processing device receiving another travel data transmitted back by the system control device in a predetermined time period, the processing device controls the vehicle body to travel according to another travel data transmitted back by the system control device, and wherein in response to the processing device not receiving another travel data transmitted back by the system control device in the predetermined time period, the processing device determines whether or not to change at least one of the travel speed and the travel direction of the vehicle body according to the image capture data and the laser sensing data.

4. The rail vehicle system according to claim 2, wherein after the processing device transmits the current position data to the system control device, in response to the processing device receiving another travel data transmitted back by the system control device in a predetermined time period, the processing device controls the vehicle body to travel according to another travel data transmitted back by the system control device, and wherein in response to the processing device receiving another travel data transmitted back by the system control device after the predetermined time period, the processing device determines whether or not to change at least one of the travel speed and the travel direction of the vehicle body according to the image capture data and the laser sensing data.

5. The rail vehicle system according to claim 1, further comprising at least two rails respectively defined as a main line rail and a branch line rail, wherein one end of the branch line rail is connected to one end of the main line rail, wherein the at least one rail vehicle traveling on the main line rail is configured to travel from the main line rail to the branch line rail, or the at least one rail vehicle traveling on the branch line rail is configured to travel from the branch line rail to the main line rail, wherein the rail vehicle system further includes a least one sign unit disposed near a position where the main line rail is connected to the branch line rail, wherein the calculation module is configured to determine whether the at least one sign unit is in a scope of vision of the image capture module according to the image capture data, and in response to the calculation module determining that the at least one sign unit is in the scope of vision according to the image capture data, the calculation module controls the vehicle body to be stopped or changes the travel speed.

6. The rail vehicle system according to claim 5, wherein when the calculation module determines that the at least one sign unit is in the scope of vision according to the image capture data, the calculation module controls the vehicle body to stop travelling and wait for a predetermined time period.

7. The rail vehicle system according to claim 6, further comprising a plurality of rail vehicles, wherein after the calculation module of each of the rail vehicles controls the vehicle body to wait for the predetermined time period and before the calculation module controls the vehicle body to travel along the travel direction, the calculation module determines whether another one of the rail vehicles is in the scope of vision and in a sensing range of the laser receiving module in advance according to the image capture data and the laser sensing data, wherein in response to the calculation module determining that another one of the rail vehicles is in the scope of vision or in the sensing range of the laser receiving module, the calculation module controls the vehicle body to wait for another predetermined time period, and wherein in response to the calculation module determining that there is no another one of the rail vehicles in the scope of vision or the sensing range of the laser receiving module, the calculation module controls the vehicle body to travel.

8. The rail vehicle system according to claim 1, further comprising a plurality of rail vehicles, the calculation module of each of the rail vehicles is configured to determine whether another one of the rail vehicles is in a scope of vision of the image capture module and in a sensing range of the laser receiving module according to the image capture data and the laser sensing data, wherein in response to the calculation module determining that another one of the rail vehicles is in the scope of vision of the image capture module or in the sensing range of the laser receiving module according to the image capture data and the laser sensing data, the calculation module changes at least one of the travel speed and the travel direction of the vehicle body.

9. The rail vehicle system according to claim 1, further comprising a plurality of rail vehicles, wherein the at least one of the rail vehicles includes at least one warning module disposed on the vehicle body, wherein the warning module is electrically connected to the processing device, wherein when the calculation module changes at least one of the travel speed and the travel direction of the vehicle body, the calculation module controls the warning module to generate a warning data, and wherein the calculation module of each of the rail vehicles is configured to determine whether or not to change at least one of the travel speed and the travel direction of the rail vehicle according to the warning data.

10. The rail vehicle system according to claim 9, wherein each of the rail vehicles has the warning module provided thereon, each of the warning modules includes a plurality of light emitting units, in each of the rail vehicles, the calculation module is configured to control at least one of the light emitting units to emit a beam of light according to at least one of the travel speed and the travel direction of the vehicle body, and the beam of light emitted by the at least one of the light emitting units is configured to correspondingly form at least one predetermined pattern, wherein the calculation module is configured to determine whether the at least one predetermined pattern is in a scope of vision of the image capture module according to the image capture data, and wherein in response to the calculation module determining that the at least one predetermined pattern is in the scope of vision, the calculation module changes at least one of the travel speed and the travel direction of the vehicle body.

11. The rail vehicle system according to claim 1, wherein the at least one rail vehicle further includes an illumination device disposed on the vehicle body, the illumination device is electrically connected to the processing device, the processing device is configured to control the illumination device to emit a beam of light, and the beam of light emitted by the illumination device is configured to be a light source for the image capture module when the image capture module captures images.

12. The rail vehicle system according to claim 1, further comprising a plurality of rail vehicles, wherein at least one of the rail vehicles includes at least one identification unit disposed on the rail vehicle, wherein the calculation module is configured to determine whether the at least one identification unit disposed on another one of the rail vehicles is in a scope of vision of the image capture module according to the image capture data, and wherein in response to the calculation module determining that the identification unit disposed on another one of the rail vehicles is in the scope of vision, the calculation module changes at least one of the travel speed and the travel direction of the vehicle body.

13. The rail vehicle system according to claim 12, wherein each of the rail vehicles is provided with the identification units disposed thereon, each of the identification units has a different pattern, and the identification units are disposed on different surfaces of the vehicle body, and wherein in response to the calculation module determining that any one of the identification units of another one of the rail vehicles is in the scope of vision, the calculation module changes at least one of the travel speed and the travel direction of the vehicle body.

14. A rail vehicle configured to travel on a rail, comprising:
a vehicle body configured to travel on the rail;
a processing device disposed on the vehicle body, wherein the processing device includes:
a communication module configured to be communicatively connected to a remote device, wherein the communication module is configured to receive a travel data transmitted by the remote device; and
a calculation module electrically connected to the communication module, wherein when the communication module receives the travel data, the calculation module is configured to control the vehicle body to travel on the rail along a travel direction; and
a visual sensing device disposed on the vehicle body, wherein the visual sensing device is electrically connected to the processing device, and the visual sensing device includes:
an image capture module disposed on the vehicle body, wherein the image capture module is configured to capture an image from one side of the vehicle body to generate an image capture data, and wherein the image capture module is configured to transmit the image capture data to the processing device;

a laser emitting module disposed on the vehicle body, wherein the laser emitting module is disposed near the image capture module, and the laser emitting module is configured to emit a laser beam toward one side of the vehicle body; and a laser receiving module disposed on the vehicle body, wherein the laser receiving module is disposed near the image capture module, wherein the laser receiving module is configured to receive the laser beam reflected by an object that is located at one side of the vehicle body, and after the laser receiving module receives the reflected laser beam, the laser receiving module correspondingly generates a laser sensing data, and wherein the laser receiving module is configured to transmit the laser sensing data to the processing device, wherein in a process where the processing device controls the vehicle body to travel on the rail along the travel direction, the image capture module continuously captures images and continuously transmits the image capture data to the processing device, the laser emitting module continuously emits the laser beam, and the laser receiving module continuously receives the reflected laser beam and continuously transmits the laser sensing data to the processing device, and wherein in the process where the processing device controls the vehicle body to travel on the rail along the travel direction, the calculation module determines whether or not to change at least one of a travel speed and the travel direction of the vehicle body according to at least one of the image capture data and at least one of the laser sensing data.

15. The rail vehicle according to claim 14, further comprising a positioning device disposed on the vehicle body, wherein the positioning device is configured to detect at least one rail positioning unit disposed at an outer periphery of the rail to generate a position detecting data, wherein the positioning device is electrically connected to the processing device, and the positioning device is configured to transmit the position detecting data to the processing device, and wherein after the processing device receives the position detecting data, the processing device is configured to control the communication module to transmit a current position data to the remote device.

16. The rail vehicle according to claim 15, wherein after the processing device transmits the current position data to the remote device, in response to the processing device receiving another travel data transmitted back by the remote device in a predetermined time period, the processing device controls the vehicle body to travel according to another travel data transmitted back by the remote device, and wherein in response to the processing device not receiving another travel data transmitted back by the remote device in the predetermined time period, the processing device determines whether or not to change at least one of the travel speed and the travel direction of the vehicle body according to the image capture data and the laser sensing data.

17. The rail vehicle according to claim 15, wherein after the processing device transmits the current position data to the remote device, in response to the processing device receiving another travel data transmitted back by the remote device in a predetermined time period, the processing device controls the vehicle body to travel according to another travel data transmitted back by the remote device, and wherein in response to the processing device receiving another travel data transmitted back by the remote device after the predetermined time period, the processing device determines whether or not to change at least one of the travel speed and the travel direction of the vehicle body according to the image capture data and the laser sensing data.

18. The rail vehicle according to claim 14, wherein the calculation module is configured to determine whether a sign unit is in a scope of vision of the image capture module according to the image capture data, and in response to the calculation module determining that the sign unit is in the scope of vision according to the image capture data, the calculation module controls the vehicle body to be stopped or changes the travel speed.

19. The rail vehicle according to claim 18, wherein when the calculation module determines that the sign unit is in the scope of vision according to the image capture data, the calculation module controls the vehicle body to stop traveling and wait for a predetermined time period.

20. The rail vehicle according to claim 19, wherein after the calculation module controls the vehicle body to wait for the predetermined time period and before the calculation module controls the vehicle body to travel along the travel direction, the calculation module determines whether another rail vehicle is in the scope of vision and in a sensing range of the laser receiving module in advance according to the image capture data and the laser sensing data, wherein in response to the calculation module determining that another rail vehicle is in the scope of vision or in the sensing range of the laser receiving module, the calculation module controls the vehicle body to wait for another predetermined time period, and wherein in response to the calculation module determining that there is no another rail vehicle in the scope of vision or the sensing range of the laser receiving module, the calculation module controls the vehicle body to travel.

21. The rail vehicle according to claim 14, wherein the calculation module is configured to determine whether another rail vehicle is in the scope of vision and in a sensing range of the laser receiving module according to the image capture data and the laser sensing data, wherein in response to the calculation module determining that another rail vehicle is in the scope of vision or in the sensing range of the laser receiving module according to the image capture data and the laser sensing data, the calculation module changes at least one of the travel speed and the travel direction of the vehicle body.

22. The rail vehicle according to claim 14, further comprising at least one warning module disposed on the vehicle body, wherein the at least one warning module is electrically connected to the processing device, wherein when the calculation module changes at least one of the travel speed and the travel direction of the vehicle body, the calculation module controls the at least one warning module to generate a warning data, and wherein the calculation module is configured to determine whether or not to change at least one of the travel speed and the travel direction of the rail vehicle according to the warning data.

23. The rail vehicle according to claim 22, wherein the at least one warning module includes a plurality of light emitting units, the calculation module is configured to control at least one of the light emitting units to emit a beam of light according to at least one of the travel speed and the travel direction of the vehicle body, and the beam of light emitted by the at least one of the light emitting units is configured to correspondingly form at least one predetermined pattern, wherein the calculation module is configured to determine whether the at least one predetermined pattern is in a scope of vision of the image capture module according to the image capture data, and wherein in response to the calculation module determining that the at least one predetermined pattern is in the scope of vision, the calculation module changes at least one of the travel speed and the travel direction of the vehicle body.

24. The rail vehicle according to claim 14, further comprising an illumination device disposed on the vehicle body, wherein the illumination device is electrically connected to the processing device, and wherein the processing device is configured to control the illumination device to emit a beam of light, and the beam of light emitted by the illumination device is configured to be a light source for the image capture module when the image capture module captures images.

25. The rail vehicle according to claim 14, further comprising at least one identification unit disposed on one end of the rail vehicle, wherein the calculation module is configured to determine whether the at least one identification unit disposed on another rail vehicle is in a scope of vision of the image capture module according to the image capture data, and wherein in response to the calculation module determining that the at least one identification unit disposed on another rail vehicle is in the scope of vision, the calculation module changes at least one of the travel speed and the travel direction of the vehicle body.

26. The rail vehicle according to claim 25, wherein the rail vehicle is provided with the identification units disposed thereon, each of the identification units has a different pattern, and the identification units are disposed on different surfaces of the vehicle body, and wherein in response to the calculation module determining that any one of the identification units of another rail vehicle is in the scope of vision, the calculation module changes at least one of the travel speed and the travel direction of the vehicle body.

27. A visual sensing device configured to be disposed on a rail vehicle, wherein the rail vehicle is configured to travel on a rail along a travel direction, and the rail vehicle includes a processing device, the visual sensing device comprising:
 a vision calculation module;
 an image capture module configured to capture an image from one side of the vehicle body to generate an image capture data, wherein the image capture module is electrically connected to the vision calculation module, and wherein the image capture module is configured to transmit the image capture data to the vision calculation module;
 a laser emitting module disposed near the image capture module, wherein the laser emitting module is configured to emit a laser beam toward one side of the vehicle body;
 a laser receiving module disposed near the image capture module, wherein the laser receiving module is configured to receive the laser beam reflected by an object that is located at one side of the vehicle body, and after the laser receiving module receives the reflected laser beam, the laser receiving module correspondingly generates a laser sensing data, and wherein the laser receiving module is configured to transmit the laser sensing data to the vision calculation module; and
 a connection unit electrically connected to the vision calculation module, wherein the connection unit is connected to the processing device, and the connection unit is configured to transmit the image capture data and the laser sensing data to the processing device, and wherein the vision calculation module is configured to receive a start signal transmitted by the processing module through the connection unit,
wherein when the vision calculation module receives the start signal through the connection unit, the vision calculation module controls the image capture module, the laser emitting module, and the laser receiving module to be operated, and the vision calculation module transmits the image capture data and the laser sensing data to the processing device through the connection unit, so that when the rail vehicle travels, the processing device is configured to determine whether or not to change at least one of a travel speed and the travel direction according to the image capture data and the laser sensing data.

28. The visual sensing device according to claim 27, wherein the vision calculation module is configured to generate a stop data or a deceleration data according to the image capture data and the laser sensing data, and wherein the vision calculation module is configured to transmit the stop data or the deceleration data to the processing device.

29. The visual sensing device according to claim 28, wherein the vision calculation module is configured to determine whether a sign unit or another rail vehicle is in a scope of vision of the image capture module and in a sensing range of the laser receiving module according to the image capture data and the laser sensing data, and wherein in response to the vision sensing module determining the sign unit or another rail vehicle is in the scope of vision or in the sensing range, the vision calculation module transmits the stop data or the deceleration data to the processing device.

30. The visual sensing device according to claim 28, further comprising at least one identification unit configured to be disposed on the rail vehicle, wherein the vision calculation module is configured to determine whether the at least one identification unit disposed on another rail vehicle is in a scope of vision of the image capture module according to the image capture data, and wherein in response to the vision calculation module determining that the at least one identification unit disposed on another rail vehicle is in the scope of vision, the vision calculation module transmits the stop data or the deceleration data to the processing device.

* * * * *